US012143770B2

(12) United States Patent
Albahri et al.

(10) Patent No.: US 12,143,770 B2
(45) **Date of Patent: *Nov. 12, 2024**

(54) ACOUSTIC RECEIVERS WITH MULTIPLE DIAPHRAGMS

(71) Applicant: KNOWLES ELECTRONICS, LLC, Itasca, IL (US)

(72) Inventors: Shehab Albahri, Hanover Park, IL (US); Yahui Zhang, Schaumburg, IL (US); Kalyan Nadella, Chicago, IL (US); Thomas Miller, Arlington Heights, IL (US); Christopher Monti, Elgin, IL (US); Charles King, Oak Park, IL (US); Jose Salazar, Chicago, IL (US)

(73) Assignee: KNOWLES ELECTRONICS, LLC, Itasca, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/498,295

(22) Filed: Oct. 31, 2023

(65) Prior Publication Data

US 2024/0064471 A1 Feb. 22, 2024

Related U.S. Application Data

(63) Continuation of application No. 18/056,582, filed on Nov. 17, 2022, now Pat. No. 11,832,054, which is a (Continued)

(51) Int. Cl.

*H04R 11/02* (2006.01)
*H04R 1/10* (2006.01)

(Continued)

(52) U.S. Cl.

CPC ............... *H04R 11/02* (2013.01); *H04R 1/10* (2013.01); *H04R 9/027* (2013.01); *H04R 9/04* (2013.01)

(58) Field of Classification Search

CPC .......... H04R 11/02; H04R 1/10; H04R 9/027; H04R 9/04

See application file for complete search history.

(56) References Cited

U.S. PATENT DOCUMENTS 1,579,595 A 4/1926 Cole et al.
2,081,619 A 5/1937 Ebert (Continued)

FOREIGN PATENT DOCUMENTS

CN 204291354 U 4/2015
CN 204350282 U 5/2015

(Continued)

*Primary Examiner* — Sunita Joshi

(57) ABSTRACT

Sound-producing acoustic receivers are disclosed. The acoustic receiver includes a receiver housing with a first internal volume and a second internal volume, a first diaphragm separating the first internal volume into a first front volume and a first back volume such that the first front volume has a first sound outlet port, a second diaphragm separating the second internal volume into a second front volume and a second back volume such that the second front volume has a second sound outlet port, a motor disposed at least partially inside the housing such that the motor including an armature mechanically coupled to both the first diaphragm and the second diaphragm, an acoustic seal between the first front volume and the second back volume such that the acoustic seal accommodates the mechanical coupling of the armature to one of the first diaphragm or the second diaphragm.

20 Claims, 17 Drawing Sheets

FIG. 13

Related U.S. Application Data continuation of application No. 17/583,813, filed on Jan. 25, 2022, now Pat. No. 11,570,551, which is a continuation of application No. 17/134,307, filed on Dec. 26, 2020, now Pat. No. 11,272,294.

(60) Provisional application No. 62/955,318, filed on Dec. 30, 2019.

(51) Int. Cl.

| | |
|---|---|
| ***H04R 9/02*** | (2006.01) |
| ***H04R 9/04*** | (2006.01) |

(56) References Cited

U.S. PATENT DOCUMENTS

| | | | | |
|---|---|---|---|---|
| 6,563,933 | B1 | 5/2003 | Niederdraenk | |
| 6,931,140 | B2 | 8/2005 | Halteren et al. | |
| 7,103,196 | B2 | 9/2006 | Warren | |
| 7,194,102 | B2 | 3/2007 | Harvey | |
| 7,203,334 | B2 | 4/2007 | Schafer et al. | |
| 7,302,748 | B2 | 12/2007 | Jiles et al. | |
| 7,336,797 | B2 | 2/2008 | Thompson et al. | |
| 7,415,125 | B2 | 8/2008 | Warren et al. | |
| 7,577,269 | B2 | 8/2009 | Adelman | |
| 7,860,264 | B2 | 12/2010 | Jiles et al. | |
| 7,912,240 | B2 | 3/2011 | Madaffari et al. | |
| 9,137,605 | B2 | 9/2015 | Manley et al. | |
| 9,571,941 | B2 | 2/2017 | Heidenreich et al. | |
| 10,009,593 | B2 | 6/2018 | Garcia et al. | |
| 10,009,693 | B2 | 6/2018 | Halteren et al. | |
| 11,272,294 | B2 | 3/2022 | Albahri et al. | |
| 11,438,702 | B2 | 9/2022 | Nadella et al. | |
| 11,570,551 | B2 | 1/2023 | Albahri et al. | |
| 11,671,778 | B1 | 6/2023 | Jacob et al. | |
| 11,832,054 | B2 | 11/2023 | Albahri et al. | |
| 2012/0057734 | A1 * | 3/2012 | Ambrose | H04R 25/43 381/328 |
| 2013/0284537 | A1 | 10/2013 | LoPresti et al. | |
| 2015/0373456 | A1 | 12/2015 | Dayton et al. | |
| 2016/0255433 | A1 | 9/2016 | Grinker | |
| 2019/0342666 | A1 | 11/2019 | Dayton et al. | |
| 2021/0204065 | A1 | 7/2021 | Albahri et al. | |
| 2021/0204066 | A1 | 7/2021 | Nadella et al. | |
| 2022/0150643 | A1 | 5/2022 | Albahri et al. | |
| 2023/0082965 | A1 | 3/2023 | Albahri et al. | |

FOREIGN PATENT DOCUMENTS

| | | | |
|---|---|---|---|
| CN | 204350283 | U | 5/2015 |
| CN | 204350285 | U | 5/2015 |
| CN | 204350286 | U | 5/2015 |
| CN | 205830004 | U | 12/2016 |
| CN | 107222810 | A | 9/2017 |
| CN | 107222810 | B | 11/2019 |
| WO | 2018148485 | A1 | 8/2018 |

* cited by examiner

ACOUSTIC RECEIVERS WITH MULTIPLE DIAPHRAGMS

TECHNICAL FIELD

This disclosure relates generally to acoustic transducers and more specifically to balanced armature acoustic receivers comprising multiple diaphragms.

BACKGROUND

Acoustic devices including a balanced armature receiver that converts an electrical input signal to an acoustic output signal characterized by a varying sound pressure level (SPL) are generally known. Such acoustic devices may be integrated in hearing aids, headsets, hearables, or ear buds among other hearing devices worn by a user. The receiver generally includes a motor and a coil to which an electrical excitation signal is applied. The coil is disposed about a portion of an armature (also known as a reed), a movable portion of which is disposed in equipoise between magnets, which are typically retained by a yoke. Application of the excitation or input signal to the receiver coil modulates the magnetic field, causing deflection of the reed between the magnets. The deflecting reed is linked to a movable portion of a diaphragm disposed within a partially enclosed receiver housing, wherein movement of the paddle forces air through a sound outlet or port of the housing.

As the size of sound-producing acoustic devices like balanced armature receivers are reduced to accommodate increasingly smaller space allocations in host hearing devices, so too does the sound output produced by such acoustic devices. Thus there is a need to improve output in balanced armature receivers without substantially increasing its size.

BRIEF DESCRIPTION OF THE DRAWINGS

The objects, features, and advantages of the present disclosure will be more apparent to those of ordinary skill in the art upon consideration of the following Detailed Description with reference to the accompanying drawings.

Figure 1:
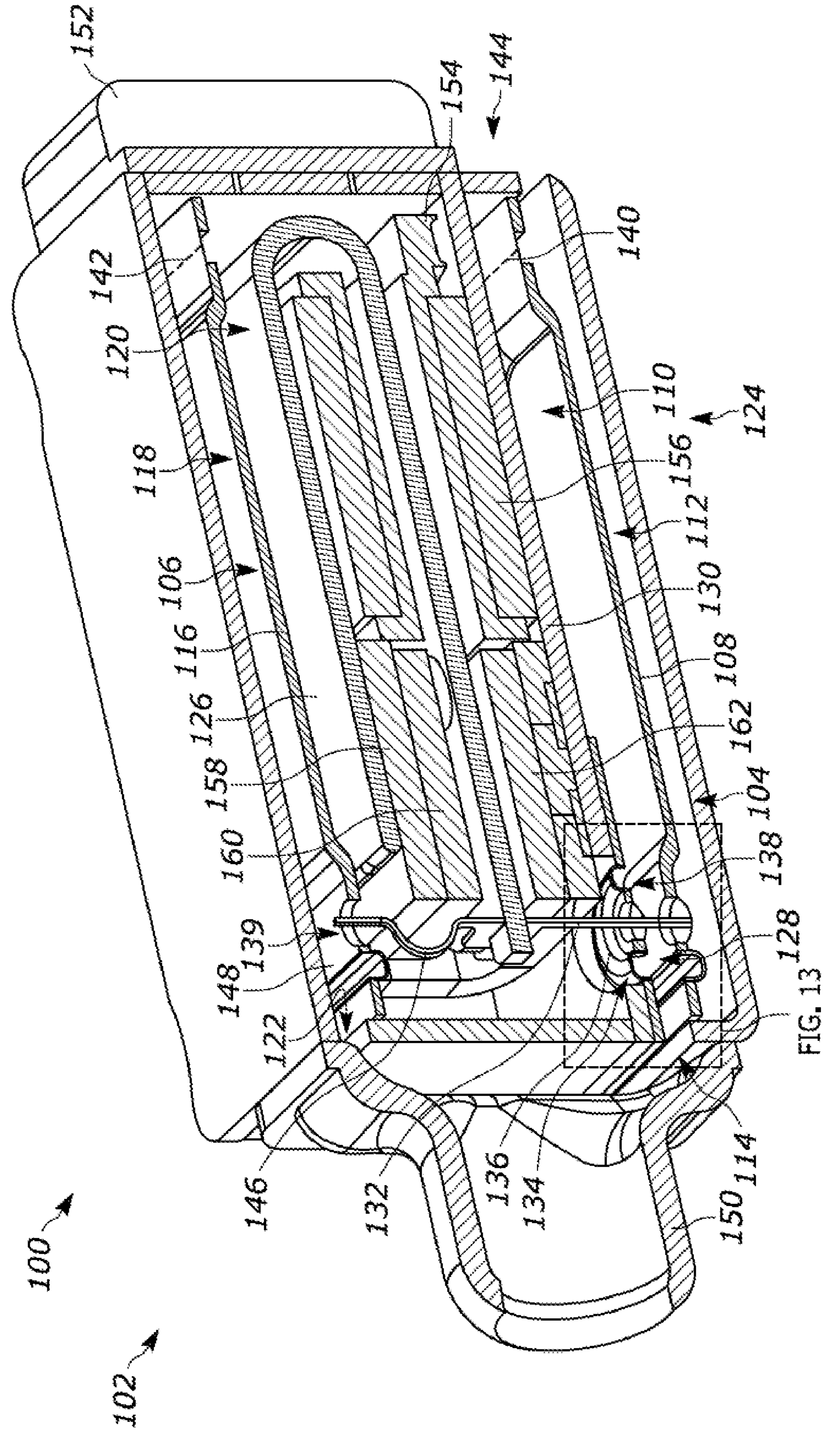
FIG. 1 shows a cross-sectional view of an acoustic receiver according to an embodiment.

Those of ordinary skill in the art will appreciate that elements in the figures are illustrated for simplicity and clarity. It will be further appreciated that certain actions or steps may be described or depicted in a particular order of occurrence while those of ordinary skill in the art will understand that such specificity with respect to sequence is not actually required unless a particular order is specifically indicated. It will also be understood that the terms and expressions used herein have the ordinary meaning as is accorded to such terms and expressions with respect to their corresponding respective fields of inquiry and study except where specific meanings have otherwise been set forth herein.

DETAILED DESCRIPTION

The present disclosure pertains to sound-producing acoustic receivers (also referred to herein as "receivers") for use in hearing devices, like behind-the-ear (BTE), in-the-ear (ITE), in-the-canal (ITC) and receiver-in-canal (RIC) hearing aids. Such receivers may also be used in headsets, wired or wireless earbuds or earpieces, or in some other hearing device that extends into, on or may be placed in close proximity to a user's ear.

The present disclosure pertains to sound-producing balanced armature acoustic receivers having multiple diaphragms. In certain implementations, the sound-producing acoustic receivers have multiple internal volumes defined by a housing, each of which is separated into a front volume and a back volume by a diaphragm. In some examples, the acoustic receiver has a motor disposed at least partially inside the housing, where the motor includes an armature that is mechanically coupled to the diaphragms. Also, an acoustic seal acoustically separates one of the front volumes from one of the back volumes while accommodating the mechanical coupling of the armature to one of the diaphragms. The acoustic receiver also includes, for each of the front volumes, a sound outlet port acoustically coupled to the front volume.

The receiver is configured in one of numerous different implementations. The receivers generally have at least two internal volumes (a first internal volume and second internal volume) separated by a wall portion of the housing, with a corresponding diaphragm separating each internal volume into corresponding front and back volumes. Both the wall and acoustic seal are located between the first front volume of the first internal volume and the second back volume of the second internal volume. Furthermore, the armature is coupled to the first or second diaphragm by a link extendable through an opening in the wall portion. Generally all of the receivers are implemented such that an acoustic impedance of the acoustic seal is greater than an acoustic impedance of the first sound outlet port over a range of human detectable frequencies.

In some embodiments, the acoustic seal is a flexible film that extends at least partially across the opening of the wall portion, with the link extending through the film. In some other embodiments, the acoustic seal comprises a gel that at least partially obstructs the opening of the wall portion, with the link extending through the gel. In some other embodiments, the acoustic seal comprises a ferrofluid that at least partially obstructs the opening of the wall portion, with the link extending through the ferrofluid. Other embodiments implement the acoustic seal as a tubular flexible film coupled to the wall portion and to the first or second diaphragm to which the link is coupled, such that the tubular flexible film aligns with the opening in the wall portion and the link extends through the tubular flexible film. In other embodiments, the acoustic seal comprises an unobstructed portion of the opening between the wall portion and the link.

In some embodiments where the flexible film is used as the acoustic seal, the flexible film is a substantially planar and resilient material. In other embodiments, the flexible film has a formed fold. In some embodiments, the flexible film is coupled to both the wall portion and to the link. In embodiments where the flexible film is coupled to the link, the link extends through the flexible film and adheres to the flexible film and to the diaphragm. In other embodiments where the flexible film is coupled to the link, the link is coupled to the flexible film without extending through the flexible film, and the flexible film is coupled to the diaphragm such that the flexible film is disposed between the link and the diaphragm.

In some embodiments, the first back volume is acoustically coupled to the second back volume. In other embodiments, one or both back volumes are vented to the atmosphere. In embodiments where the back volume is sufficiently large, venting to the atmosphere or to another back volume is may not be required. In some other embodiments, the sound outlet port of the first front volume is acoustically coupled to the second front volume.

The location of the motor also varies in different embodiments. In some embodiments, shown for example in FIGS. 2, 3 and 5, the motor is located in the first back volume, such that the first front volume is located between the first back volume and the second back volume. In some other embodiments, shown for example in FIGS. 1, 6, 10-11 and 20, the motor is instead located in the second back volume, such that the second back volume is located between the first front volume and the second front volume. In yet other embodiments, shown for example in FIG. 4, the motor is instead located in the second front volume, such that the second back volume is located between the first front volume and the second front volume. In yet other embodiments, shown for example in FIG. 8, the motor is located in the first front volume, such that the first front volume is located between the first back volume and the second back volume. In other embodiments, the motor is partially in more than one internal volume; such embodiments include configurations where the armature forms part of the diaphragm assembly, among other configurations.

In one implementation, the housing of the receiver has a third internal volume in addition to the first and second internal volumes. Thus, the receiver also has a third diaphragm that separates the third internal volume into a third front volume and a third back volume along with the armature being mechanically coupled to the third diaphragm.

In embodiments including a third diaphragm in a third internal volume, the receiver also has a second acoustic seal (in addition to the acoustic seal as previously mentioned) to accommodate the mechanical coupling of the reed to the third diaphragm. In some receivers having three diaphragms, shown for example in FIG. 3, the second acoustic seal is located between the second front volume and the third back volume. In other receivers having a third diaphragm, shown for example in FIGS. 9 and 20, the second acoustical seal is located between the third front volume and the first back volume.

Details regarding the receiver will be disclosed below in further details, with embodiments provided as non-limiting examples of the different configurations and embodiments provided herein.

FIGS. 1-14 and 20 show examples of a balanced armature receiver 100 that has two sets of internal volumes within the housing 102: a first internal volume 104 and a second internal volume 106. A first diaphragm 108 separates a first front volume 110 from a first back volume 112 in the first internal volume 104. A second diaphragm 116 separates the second internal volume 106 into a second front volume 118 and a second back volume 120. An armature 126 included in a motor 124 is coupled to the first diaphragm 108 or to the second diaphragm 116 by a link 132 which extends through the opening 134 in the wall portion 130. In some examples, the first front volume 110 is acoustically coupled with a first sound outlet port 114, and the second front volume 110 is acoustically coupled with a second sound outlet port 122.

Figure 3:
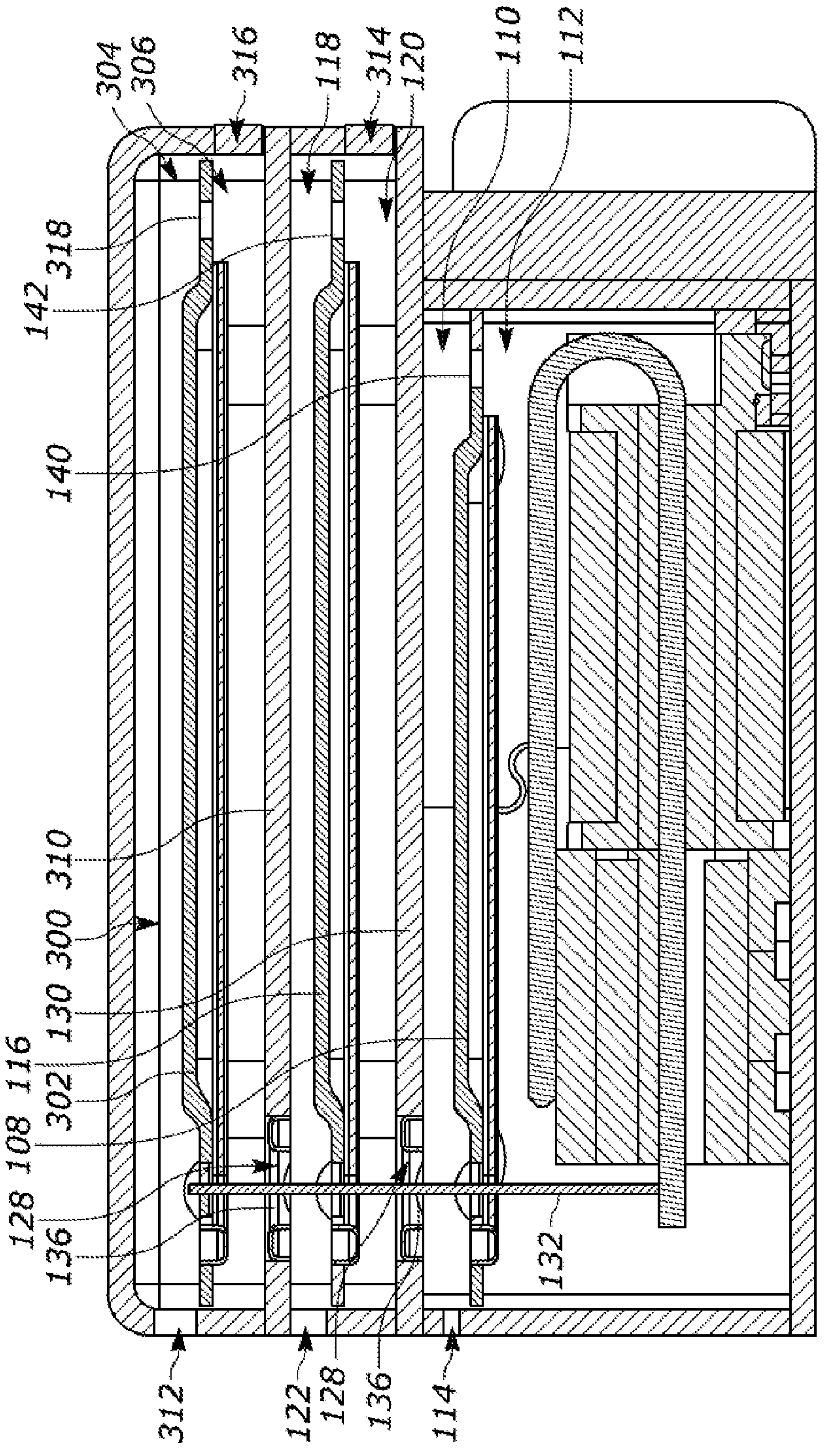
FIG. 3 shows a cross-sectional view of an acoustic receiver according to an embodiment.
Figure 8:
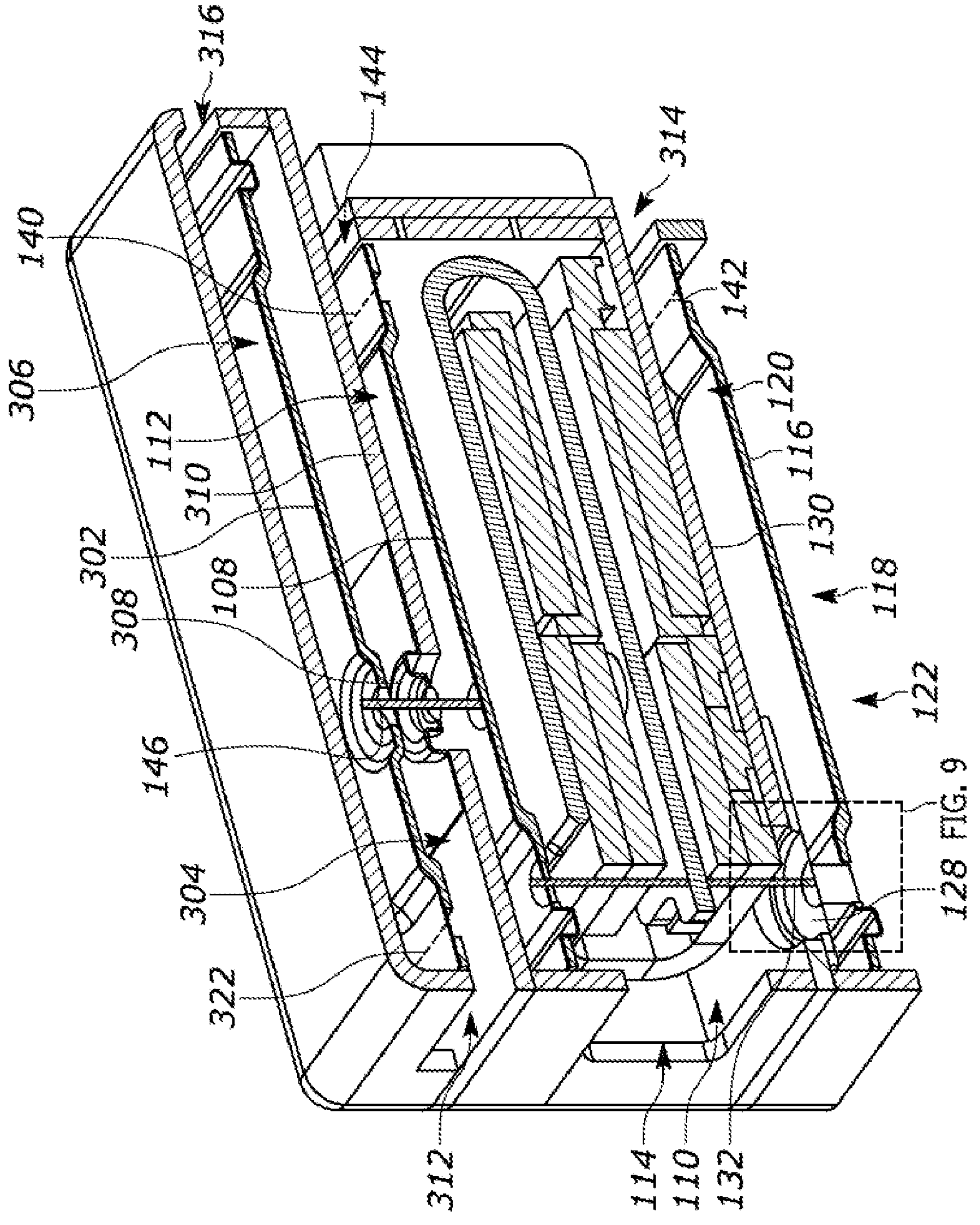
FIG. 8 shows a cross-sectional view of an acoustic receiver according to an embodiment.
Figure 20:
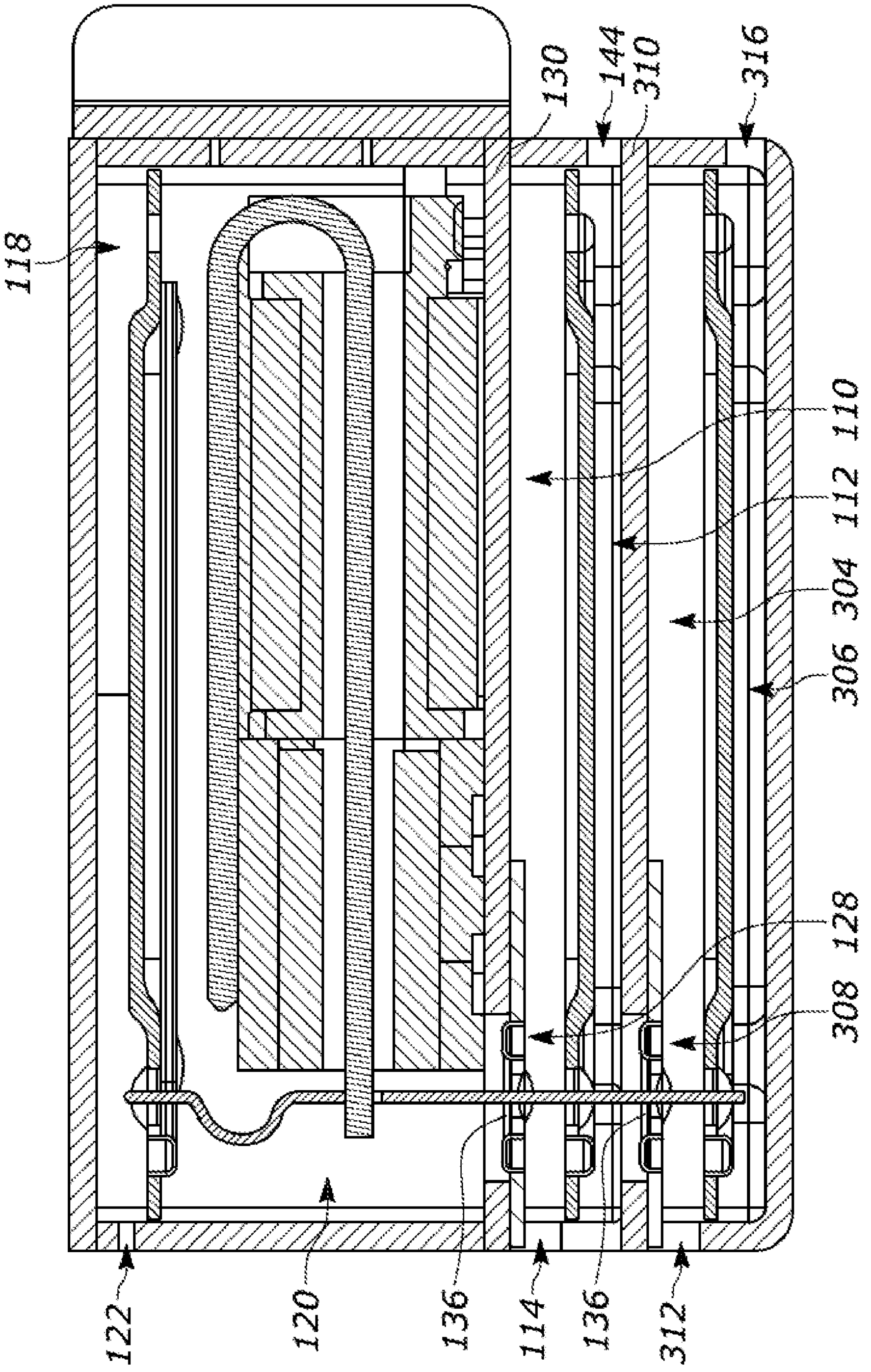
FIG. 20 shows a cross-sectional view of an acoustic receiver according to an embodiment.

In FIGS. 3, 8, and 20, a third internal volume 300 is included, such that a third diaphragm 302 separates the third internal volume 300 into a third front volume 304 and a third back volume 306. According to various embodiments disclosed herein, some of the front and back volumes are acoustically sealed from each other via one or more acoustic seals (for example, acoustic seals 128 and 308) that are placed in the wall portion(s) separating them, while some of the back volumes 112, 120, and 306 are acoustically coupled with each other in order to provide additional internal volume to allow more flexibility in the movement of the armatures, thereby improving quality of the acoustic output from the receiver, such as the bass output of the receiver.

FIGS. 1-4, 8-9, 11-16 and 19-20 show examples of a balanced armature receiver 100 that uses a flexible film 136 extending at least partially across an opening 134 of a wall portion 130 that separates the first front volume 110 from the second back volume 120, according to embodiments as disclosed herein. The flexible film 136 is made of any suitable material such as urethane or other polymers and forms an acoustic seal 128 between the first front volume 110 and the second back volume 120. The acoustic seal provided by the film or other implementation described herein is characterized by an acoustic impedance that is greater than an acoustic impedance of a sound outlet port over a range of human detectable frequencies. Generally, any of the receivers described herein can use any of the acoustic seals, or a combination of flexible film acoustic seals, described herein.

In FIGS. 1-4, 11-14, 16, and 20, the flexible film 136 has a formed fold 138 that flexibly allows the film 136 to move in response to the movement of the link 132 while maintaining the acoustic seal 128 between the first front volume 110 and the second back volume 120. In FIG. 8, the fold 138 is not present in the first acoustic seal 128 but rather in a second acoustic seal 308, and a second link 146 extends through the second acoustic seal 308 to adhere to the first diaphragm 108 as well as a third diaphragm 302, as further explained herein. In some examples, one or more of the links 132 and 146 includes a resonator 148 that alters the acoustic frequency response of the balanced armature over some range of frequencies. In FIGS. 1-4, 8, 11-14 and 20, the link 132 extends through the flexible film 128 and adheres to both the film 136 and the first diaphragm 108.

The second acoustic seal 308 is shown in FIGS. 3, 8, and 20, or any suitable example with three sets of internal volumes, for example the internal volumes 104, 106, and 300. To accommodate the mechanical coupling of the armature 126 to the third diaphragm 302, the second acoustic seal 308 is disposed between two volumes according to various embodiments. In FIG. 3, for example, the second acoustic seal 308 is located between the second front volume 118 and the third back volume 306, whereas in FIGS. 8 and 20 the second acoustic seal 308 is located between the third front volume 304 and the first back volume 112 in FIGS. 8 and 20.

Figure 9:
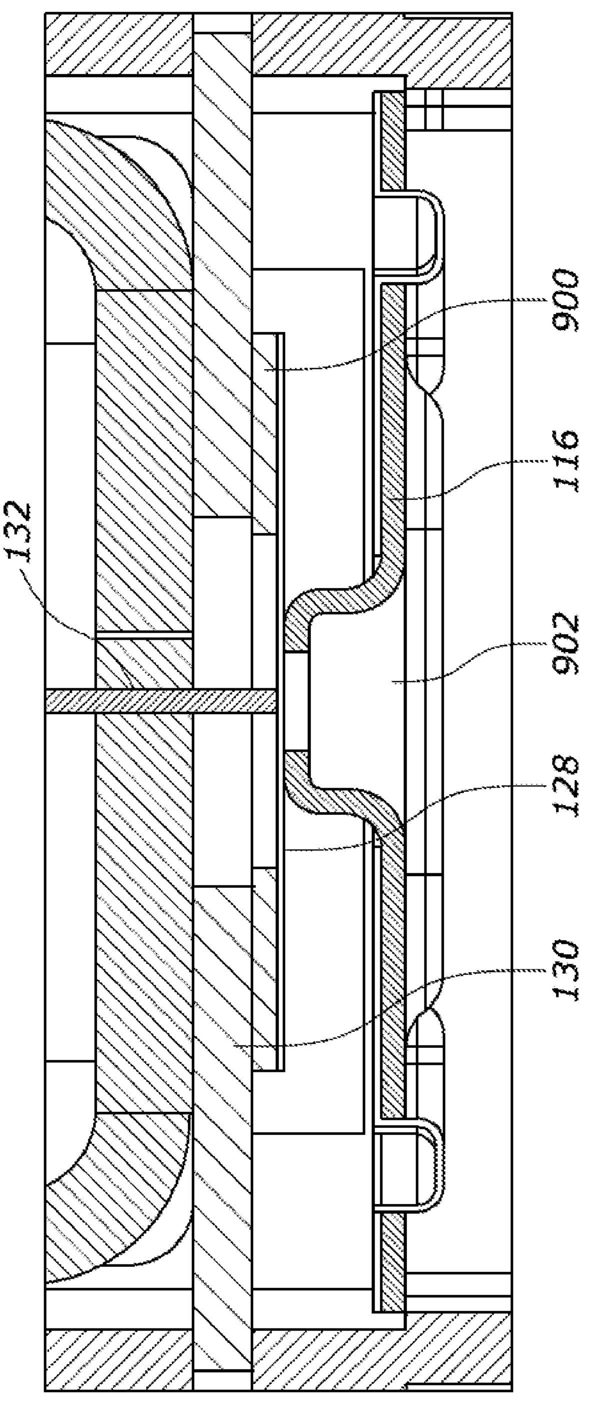
FIG. 9 shows a partial cross-sectional view of a portion of the acoustic receiver of FIG. 8 from a different angle.

In FIGS. 1-4, 8-9, 11-16, and 20, the flexible film 136 is coupled to both the wall portion 130 and the link 132. In FIGS. 8-9, the link 132 is coupled to the flexible film 136 without extending through the flexible film 136, and the flexible film 136 is coupled to the second diaphragm 116 such that the flexible film 136 is disposed between the link 132 and the second diaphragm 116. Similarly, FIG. 16 show the link 132 coupled to the flexible film 136 without extending through the film 136, but not limited to having the link 132 coupled directly to the second diaphragm 116. The link 132 is coupled to any one of the diaphragms 108, 116, and 302 as previously disclosed. An adhesive, glue or epoxy may be used to couple the film to the link and to the diaphragm in these and other embodiments described herein.

In some embodiments, the acoustic seal 128 has additional support components. In the embodiment shown in FIGS. 1 and 13, the acoustic seal 128 has an inner support 1300 shaped as a ring or disc located between the link 132 and the formed fold 138. The acoustic seal 128 also has an outer support 1302 located between the flexible film 136 and the wall portion 130. The inner and outer supports 1300 and 1302 are made of any suitable material, for example metal or plastic that is less flexible than the film 136 which they support. In some embodiments, the acoustic seal 128 has one or more openings 1304 with a high acoustic impedance formed by piercing the flexible film 136, for example, to allow air to flow therethrough. Openings 1304 may be used as a feature in any acoustic seal to modify the acoustic response of the balanced armature or to allow the relief of pressure buildup that would occur in sealed back volumes due to temperature change or barometric pressure change.

Figure 5:
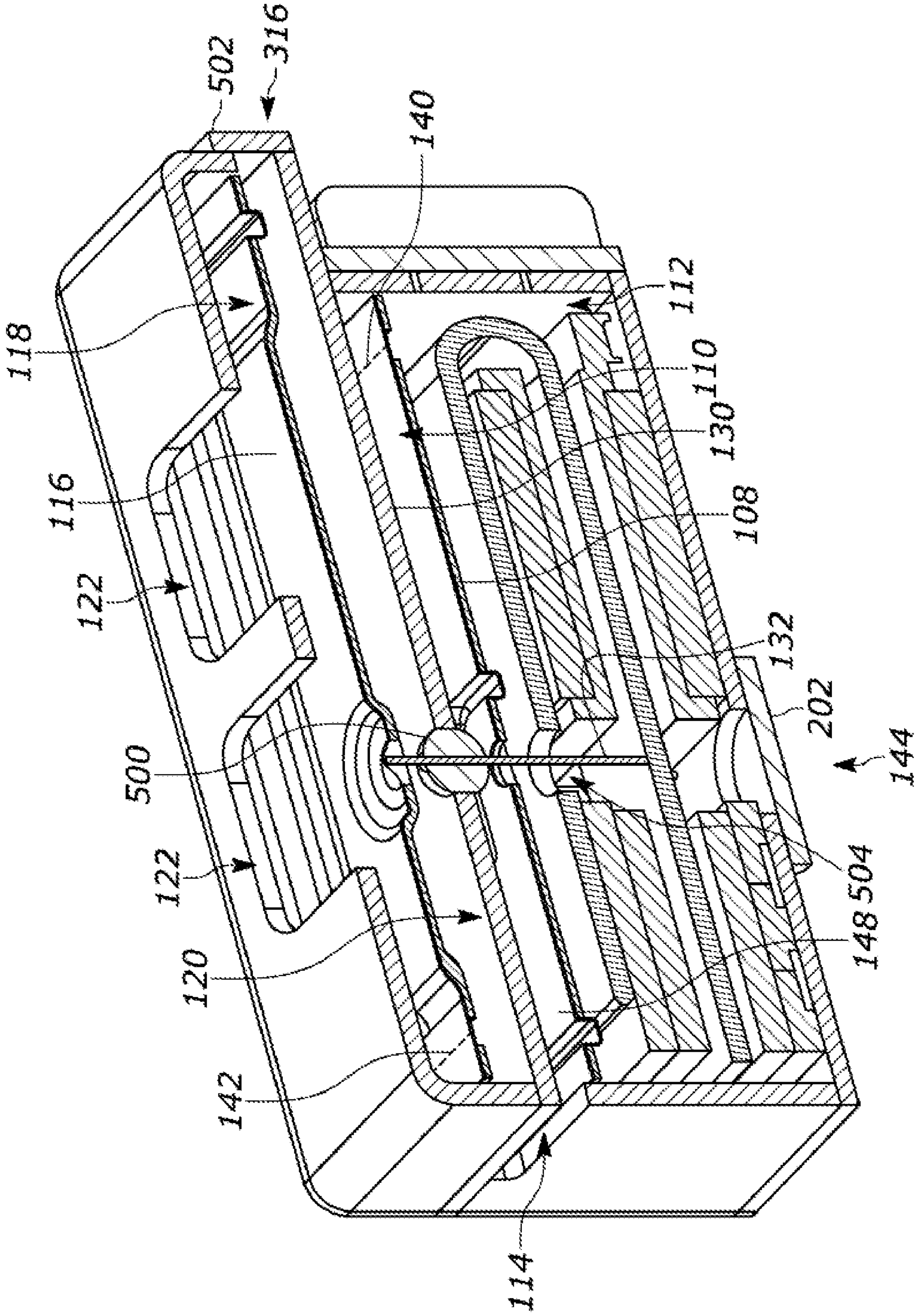
FIG. 5 shows a cross-sectional view of an acoustic receiver according to an embodiment.

In FIG. 5, the acoustic seal 128 is formed by a gel 500 between the first front volume 110 and the second back volume 120, with the link 132 extending through the gel 500. The gel 500 may be any suitable material having a low stiffness so that it will have a low impact on the overall system stiffness but still solid enough to stay in place and maintain at least a partial seal.

Figure 6:
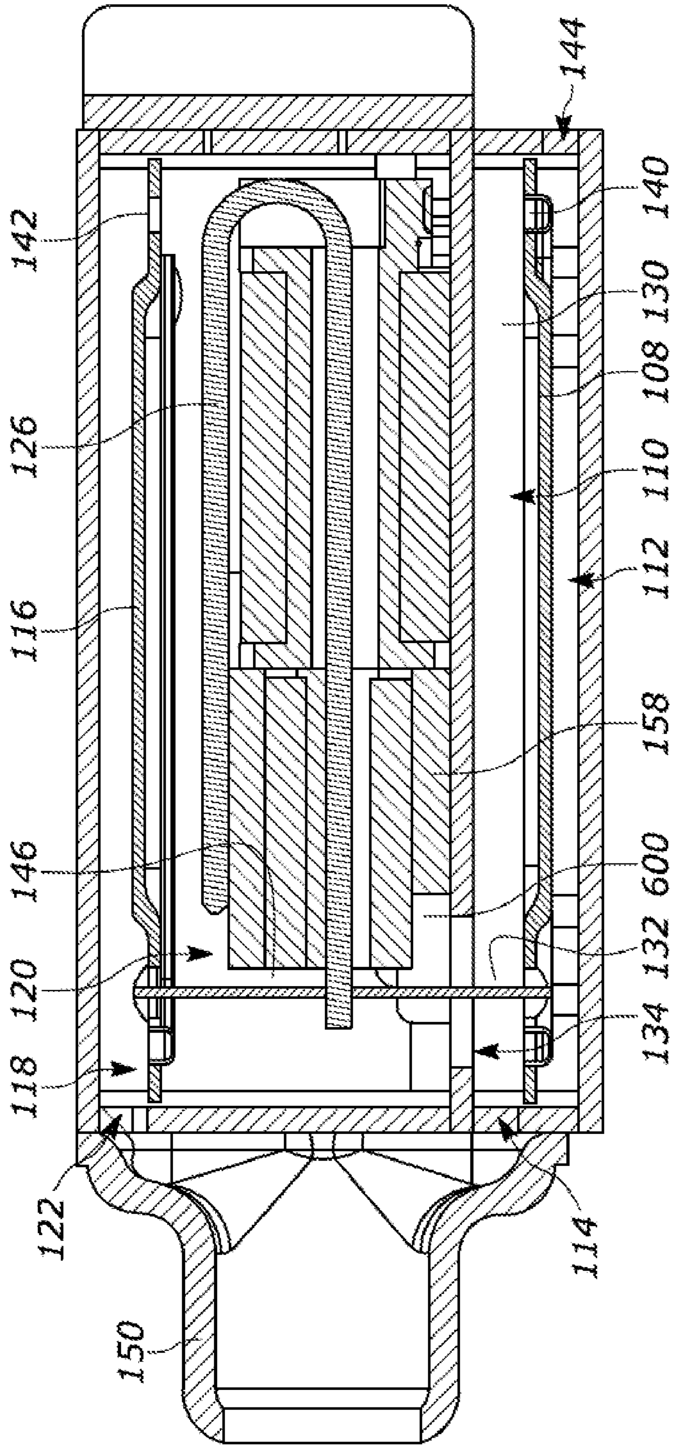
FIG. 6 shows a cross-sectional view of an acoustic receiver according to an embodiment.
Figure 7:
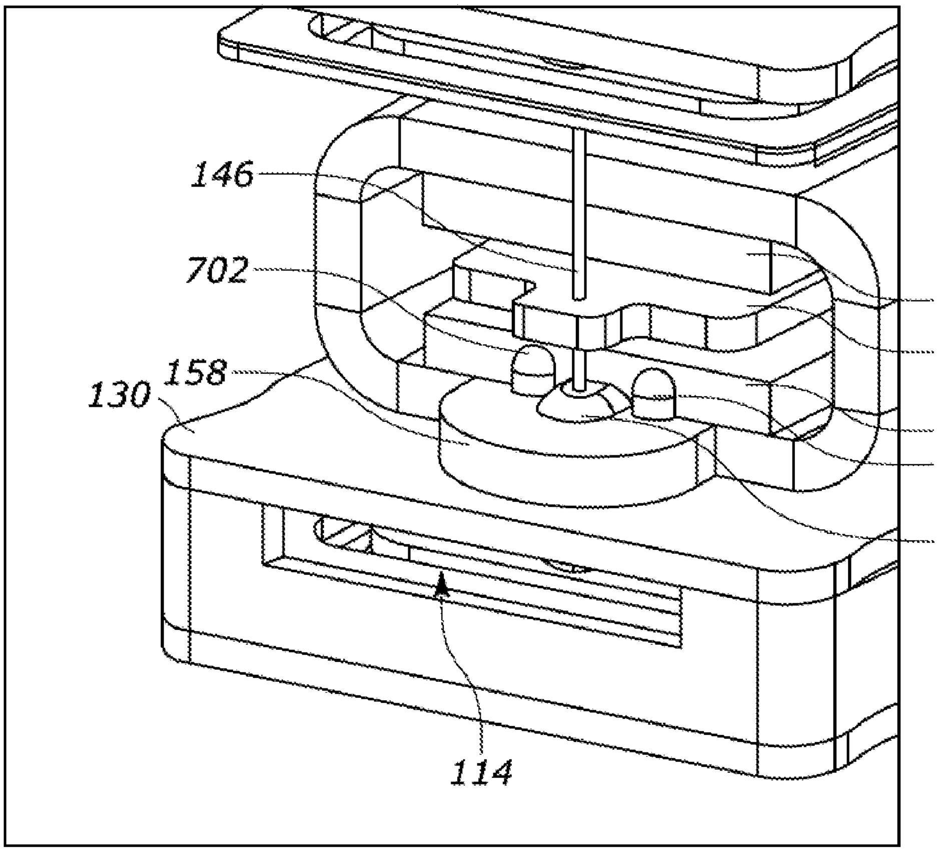
FIG. 7 shows perspective view of a portion of the acoustic receiver of FIG. 6 from a different angle for clarity.

In FIGS. 6-7, a ferrofluid 600 forms the acoustic seal 128 between the first front volume 110 and the second back volume 120. A ferrofluid is a viscous fluid like oil having magnetic particles or dust suspended therein. The ferrofluid 600 provides the acoustic seal 128 by covering a portion of the yoke 158 that extends over the opening 134 while permitting the link to actuate the diaphragm without adversely affecting its compliance. The link 132 extends through the ferrofluid 600, and one or more nonmagnetic dams (such as nonmagnetic dams 700 and 702 in FIG. 7) are attached to the yoke 158 and/or the magnet 162 to help control the positioning of the ferrofluid 600.

Figure 15:
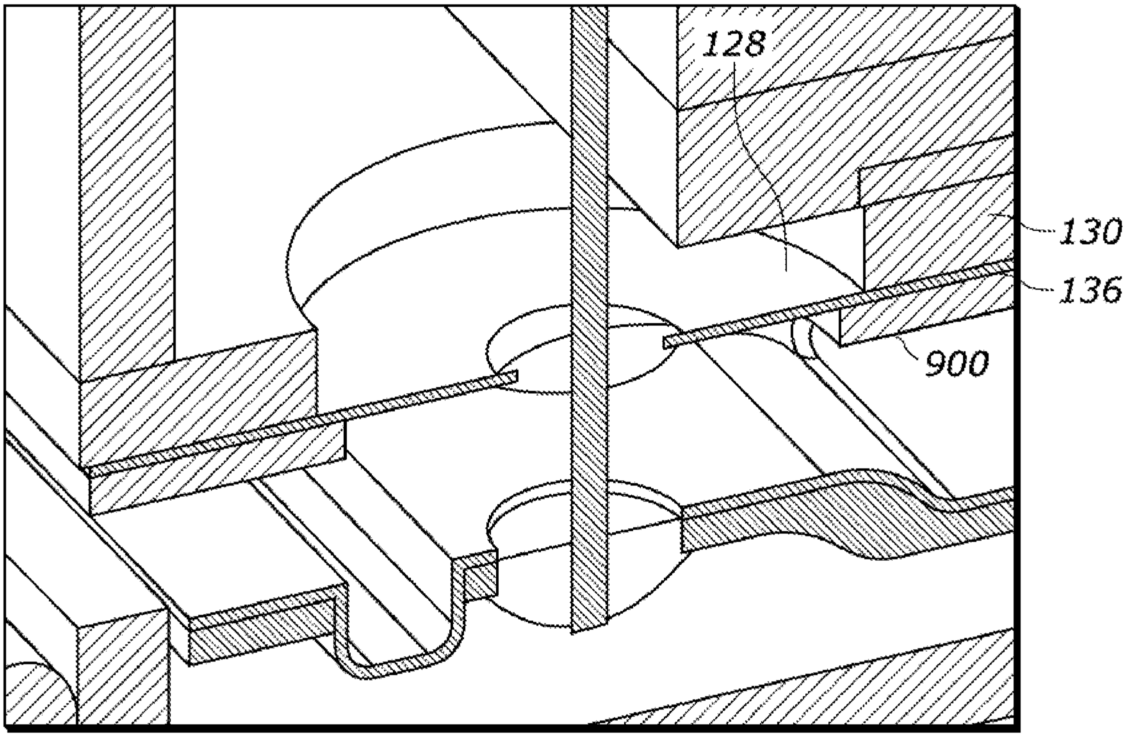
FIG. 15 shows a partial cross-sectional view of an acoustic receiver according to an embodiment.
Figure 16:
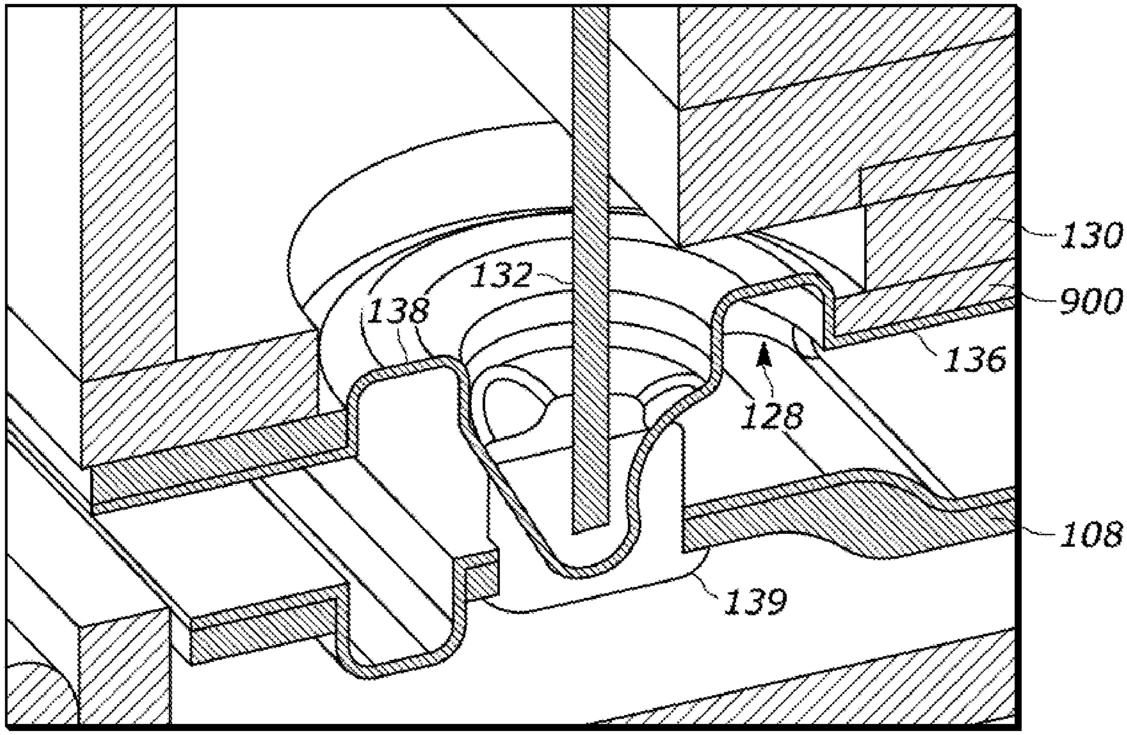
FIG. 16 shows a partial cross-sectional view of an acoustic receiver according to an embodiment.

In FIGS. 8-9 and 15, the film forming the acoustic seal 128 is flat or substantially planar. In some examples, the flat seal is formed using a resilient material. In some examples, the flat seal is formed using an elastomeric material with a soft modulus. In some examples, the soft modulus is defined by an effective Young's modulus in the range of 0.01 to 0.1 MPa. In some implementations, a carrier 900 is disposed between the film and the wall portion 130, in which the carrier 900 is made of any suitable material, for example metal or plastic, that enables attachment of the film to the wall portion 130 while maintaining the film in a predetermined configuration. For example, film may crimp or wrinkle when being attached to the wall portion 130 if mishandled. To prevent such crimping or wrinkling, the film is first attached to the carrier 900 to ensure that it is in the un-crimped and unwrinkled configuration, after which the carrier 900 is attached to the wall portion 130. In some examples, the carrier 900 is made of the same material or has similar physical properties as the inner support 1300 and/or the outer support 1302. In FIGS. 8-9, glue 902 is provided to bond with the film and to at least partially close an acoustic path between the second front volume 118 and the second back volume 120.

Figure 10:
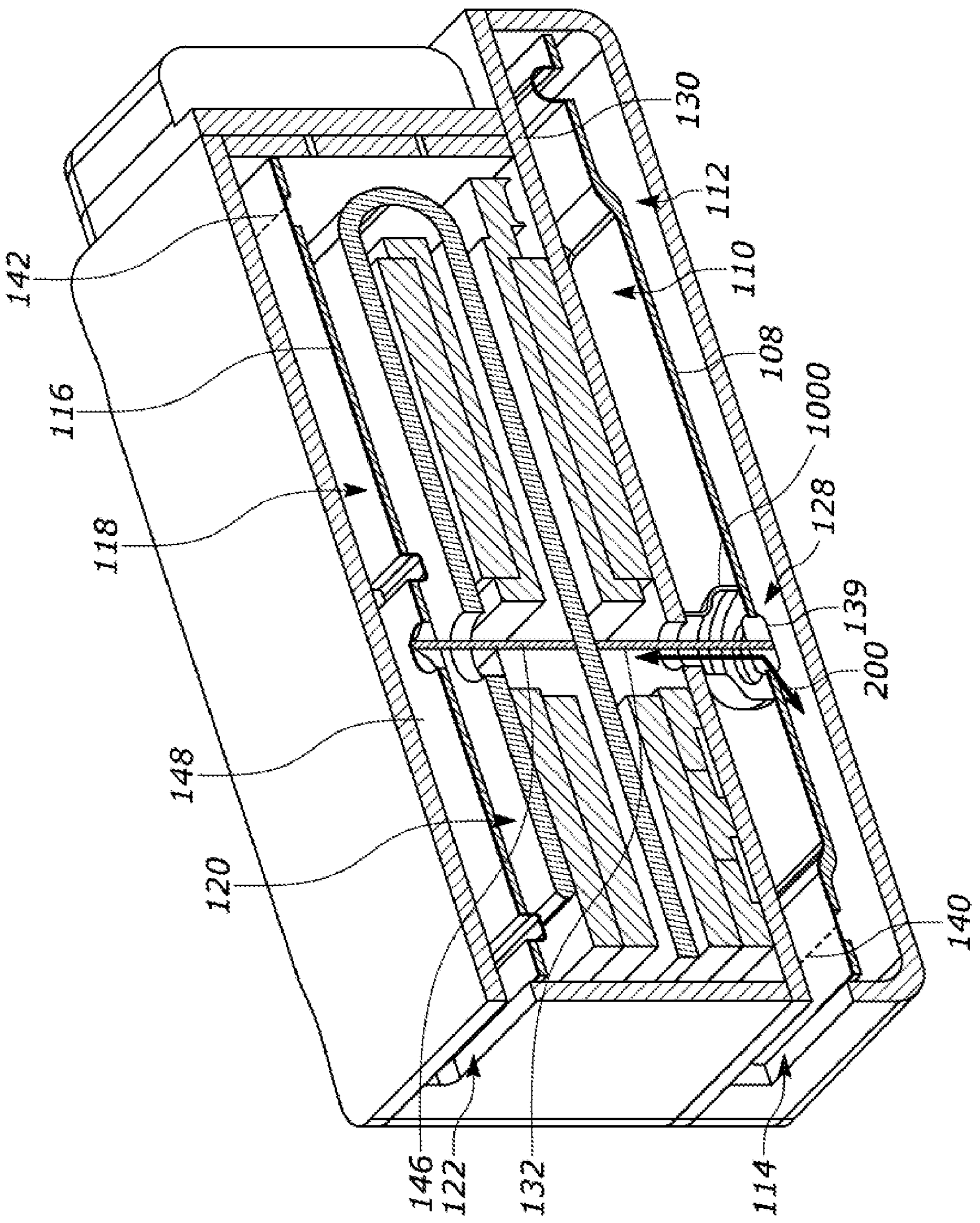
FIG. 10 shows a cross-sectional view of an acoustic receiver according to an embodiment.

In FIG. 10, the acoustic seal 128 is formed from a tubular flexible film 1000 that is coupled with the wall portion 130 and to the first diaphragm 108 to which the link 132 is also coupled. The tubular flexible film 1000 is aligned with the opening 134 in the wall portion 130 such that the link 132 extends through the tubular flexible film 1000. The tubular film 1000 forms an acoustic coupling 200 between the first back volume 112 and the second back volume 120 while maintaining the acoustic seal 128 between the first front volume 110 and the neighboring back volumes 112 and 120. In other examples, the glue 139 may completely block any opening in the diaphragm 108 thereby blocking any acoustic path between the back volumes. In some examples, the tubular film 1000 is formed from the same material as the flexible part of the first diaphragm 108 such that the tubular film 1000 is an extension of the first diaphragm 108 that attaches, for example using a glue, to the wall portion 130 to provide the acoustic seal 128.

Figure 11:
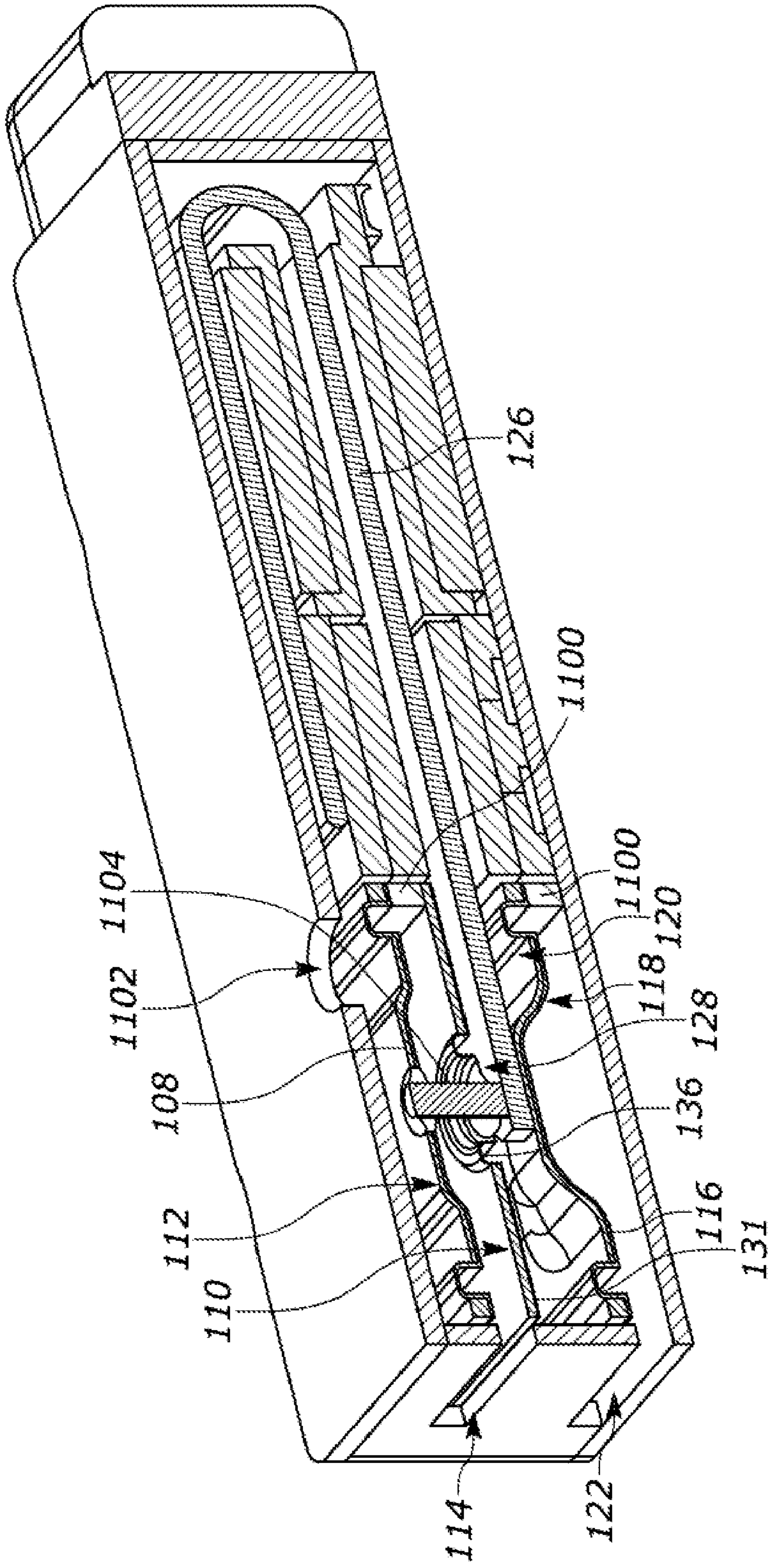
FIG. 11 shows a cross-sectional view of an acoustic receiver according to an embodiment.
Figure 12:
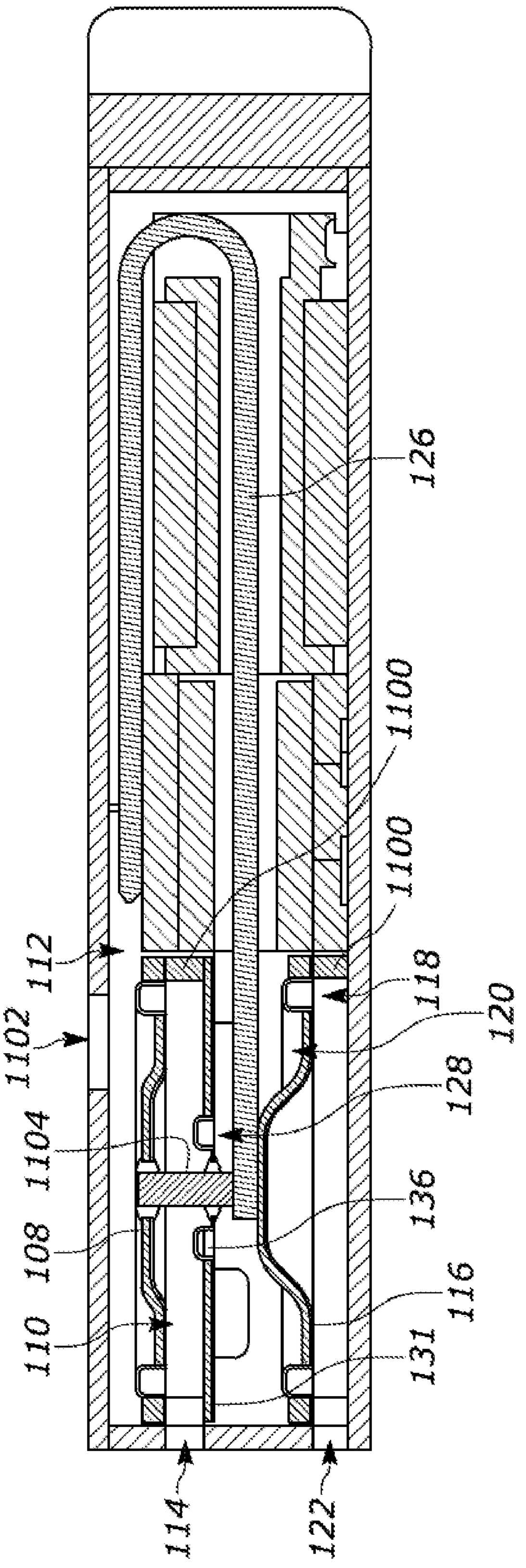
FIG. 12 shows a side view of the acoustic receiver of FIG. 11.
Figure 13:
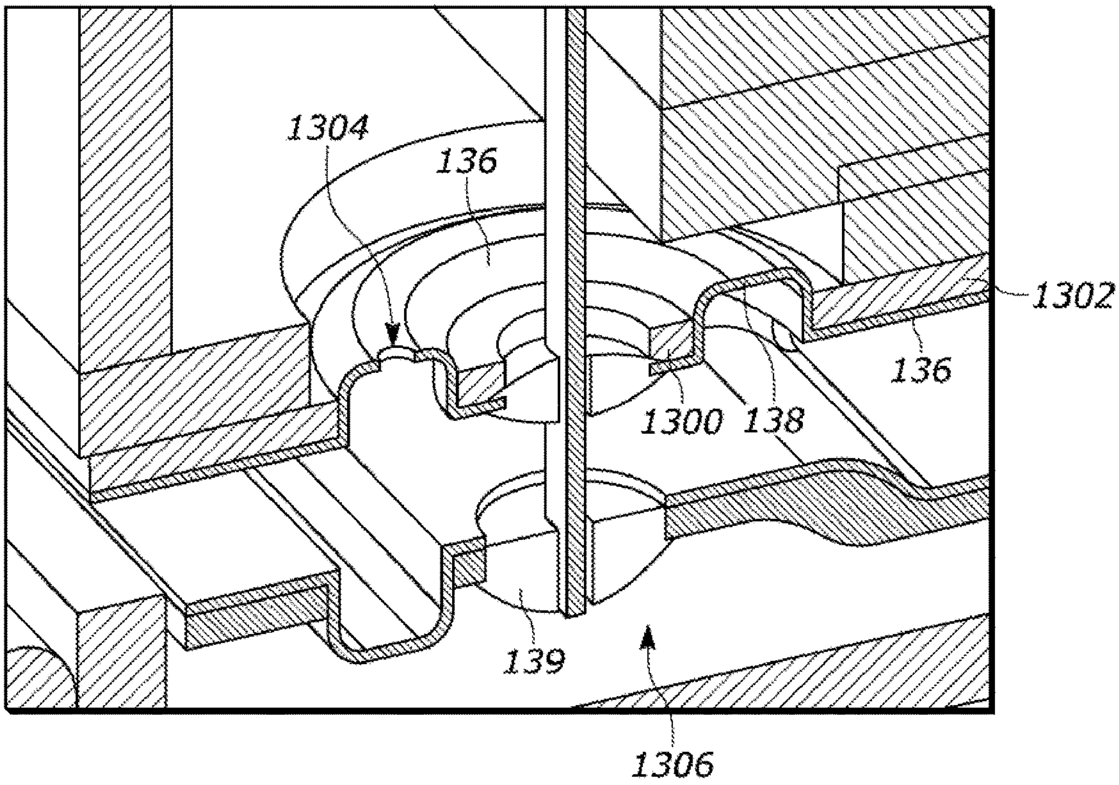
FIG. 13 shows a detailed view of the acoustic receiver of FIG. 1.
Figure 14:
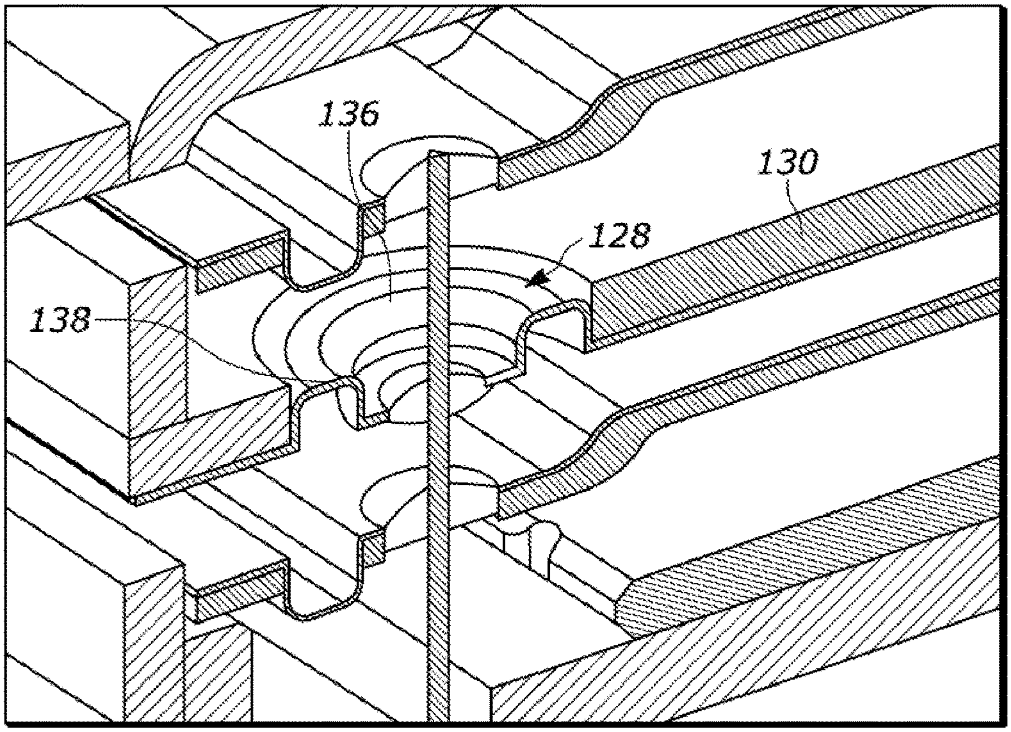
FIG. 14 shows a detailed view of the acoustic receiver of FIG. 2.

In FIGS. 11-12, the acoustic seal 128 is formed around a link post 1104 which is stiffer than the link 132 in all directions, including in the rotational degrees of freedom, such that the first diaphragm 108 moves in a piston-like manner with no loss of motion through the link post 1104. The link post 1104 allows for a stronger coupling between the diaphragms 108. There is no link between the armature 126 and the second diaphragm 116 in this embodiment, the second diaphragm 116 is directly attached to the armature 126. In other examples the stiff portion of the diaphragm 116 may be formed exclusively by a shape integrated into the armature 126 and there is no need for a separate stiff diaphragm component 116.

In FIG. 16, the link 132 does not pass through the acoustic seal 128, which in this example is the flexible film 136, but instead the flexible film 136 elastically extends toward the diaphragm 108 (or 116 or 302, as suitable) after which the coupling member 139 attaches the diaphragm 108 and the link 132 to the flexible film 136. As shown, the coupling member 139 is applied to both sides of the flexible film 136.

Figure 17:
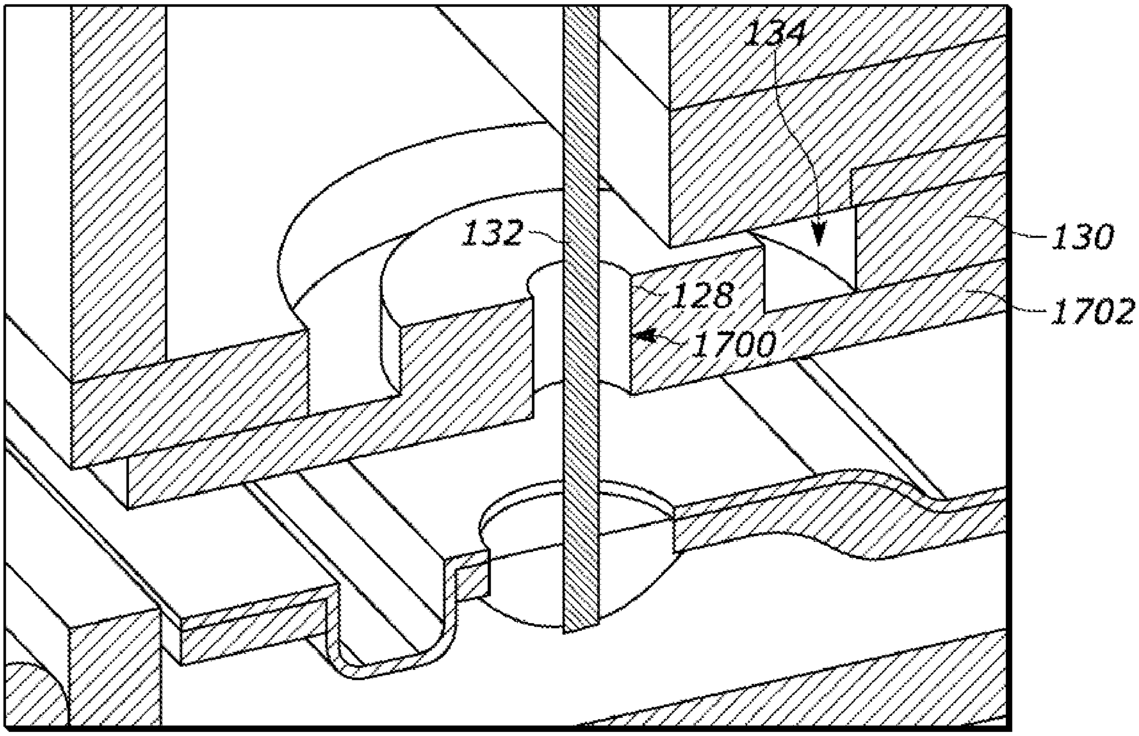
FIG. 17 shows a partial cross-sectional view of an acoustic receiver according to an embodiment.
Figure 18:
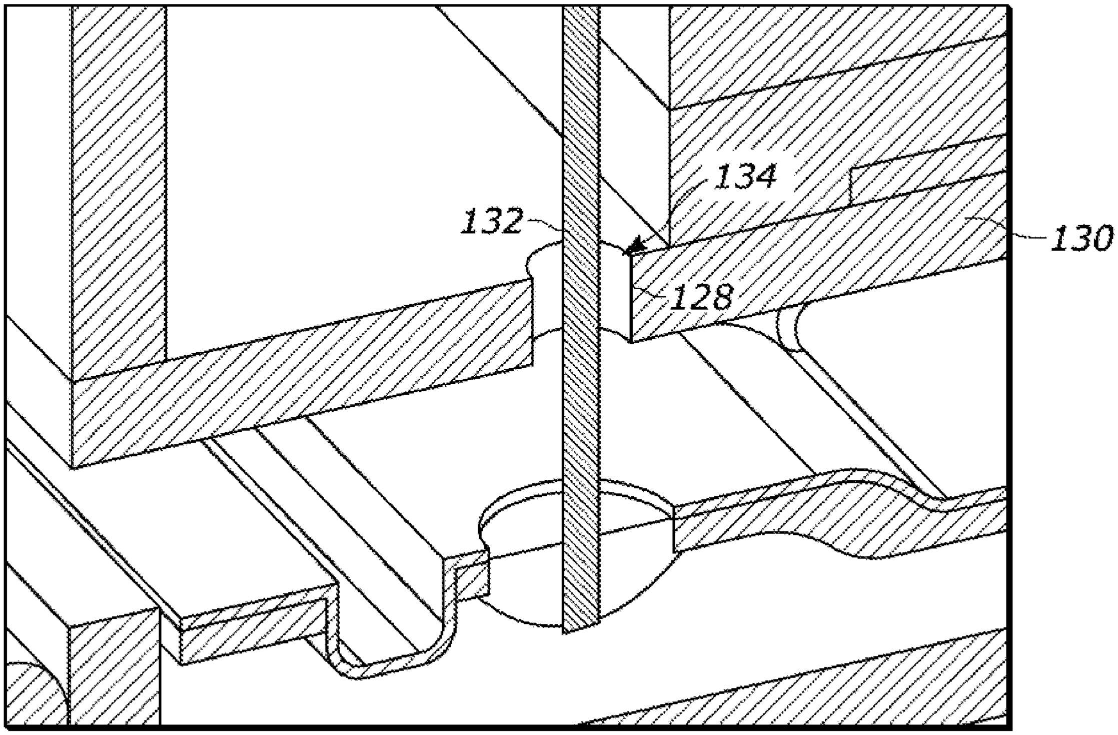
FIG. 18 shows a partial cross-sectional view of an acoustic receiver according to an embodiment.
Figure 19:
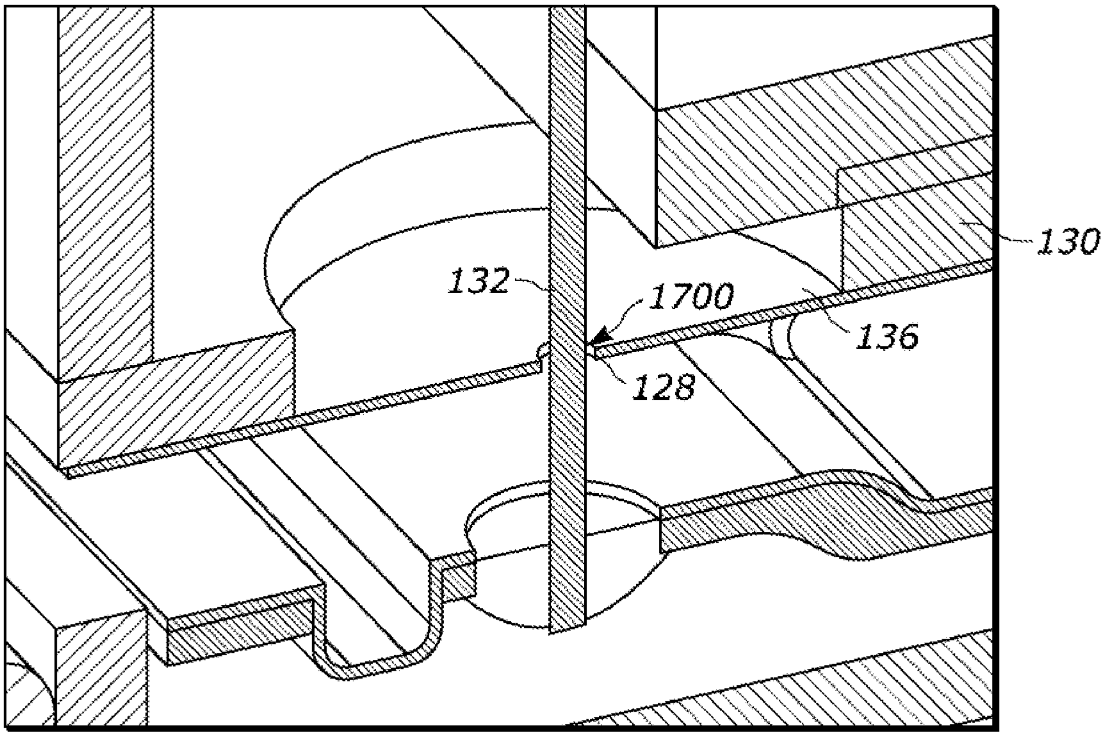
FIG. 19 shows a partial cross-sectional view of an acoustic receiver according to an embodiment.

In FIGS. 17-19, the acoustic seal 128 is formed in the opening 134 in the wall portion 130. Specifically, in FIG. 17, the opening 134 is partially covered by a seal body member 1702 (also referred to as a sleeve because the configuration surrounds the link 132) that has an unobstructed portion 1700 through which the link 132 passes. The unobstructed portion 1700 forms the acoustic seal 128 because the surface area or diameter of the unobstructed portion 1700 is substantially smaller than the surface area or diameter of the opening 134, thus enabling high acoustic impedance at the unobstructed portion 1700. The embodiment of FIG. 17 allows the opening 1700 to be aligned with the location of the drive rod thereby reducing tolerance stack-up, and it also decouples the sleeve length from the wall thickness, permitting use of a longer sleeve for a higher impedance seal. In FIG. 18, the opening 134 in the wall portion 130 has a smaller surface area or diameter than the opening 134 as previously disclosed in other embodiments. As such, the opening 134 is sufficiently small to enable high acoustic impedance, thereby forming the acoustic seal 128 therein. In some examples, grease is added at the unobstructed portion 1700 in FIGS. 17 and 19 or at the opening 134 in FIG. 18 to further increase the acoustic impedance of the acoustic seal 128 formed.

In FIG. 19, a flat or substantially planar flexible seal is formed at the opening 134 by attaching, for example, the flexible film 136 without the fold 138 to the wall portion 130. Unlike in FIGS. 8-9 and 15 which also disclose a flat or substantially planar seal, the flexible film 136 in FIG. 19 is not glued or otherwise attachably coupled to the link 132 which passes through the unobstructed portion 1700 in the flexible film 136. Nevertheless, the size, surface area, or diameter of the unobstructed portion 1700 is sufficiently small to enable high acoustic impedance at the unobstructed portion 1700, thereby forming an effective acoustic seal without using any glue or other coupling members 139.

Although different types and examples of the acoustic seal(s) are explained above, it should be understood that none of the acoustic seals are specific to the examples of the acoustic receiver in which they are shown to be implemented by the figures, and that the acoustic seals are interchangeable between different examples of the acoustic receiver. In some examples, different types of the acoustic seals may be employed in a single acoustic receiver, as deemed suitable. In some cases, the diaphragms and the acoustic seal(s) as employed in the aforementioned embodiments have the benefit of increasing the base output of the receiver compared to a conventional acoustic receiver with a single diaphragm, while maintaining the high frequency performance.

Figure 4:
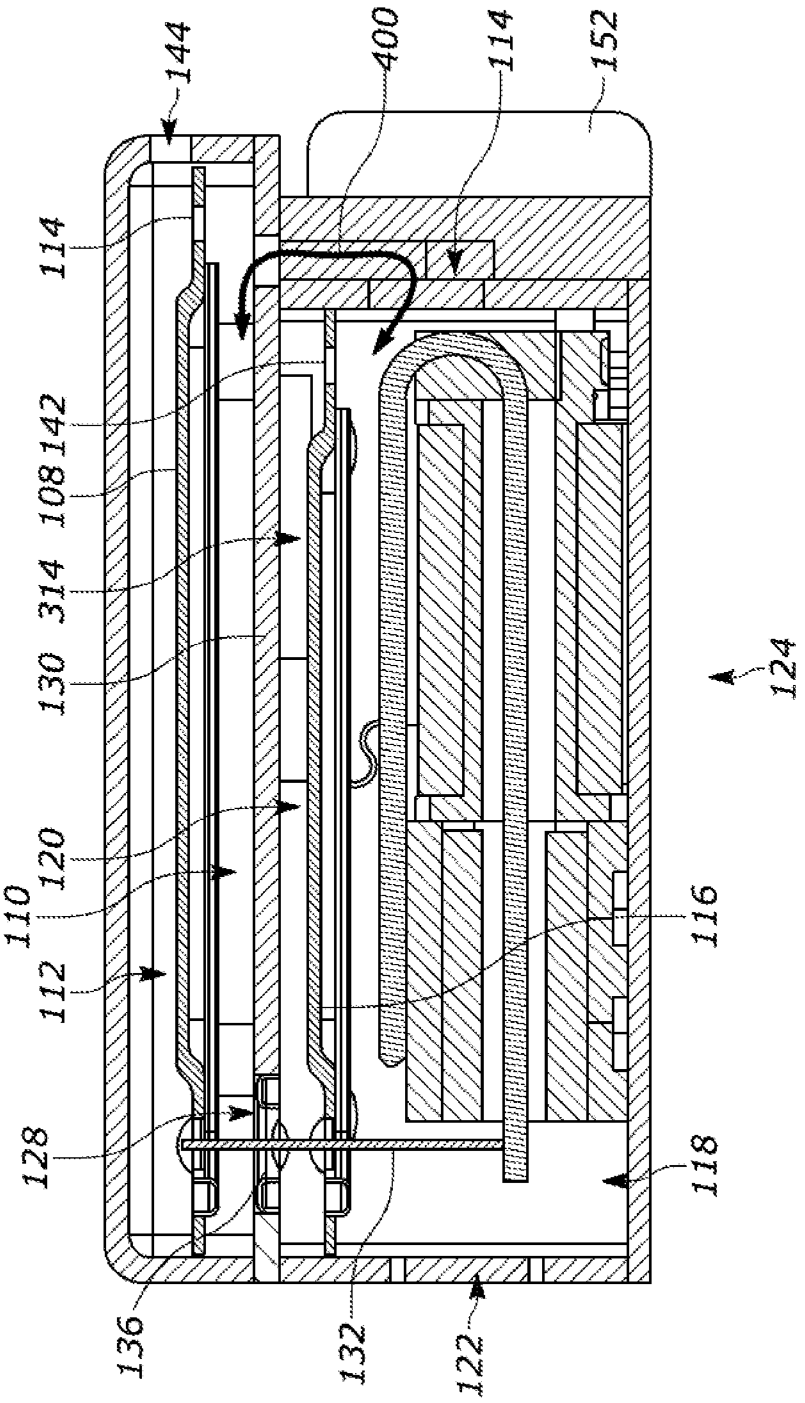
FIG. 4 shows a cross-sectional view of an acoustic receiver according to an embodiment.

In some examples, such as in FIGS. 1-12 and 20, the motor 124 is located in either a front volume or a back volume and includes the armature 126 (also known as a reed) and a pair of magnets 160, 162 disposed at a yoke 158, as well as one or more coil 156 disposed at a bobbin 154. In FIGS. 1-3 and 5, the motor 124 is located in the first back volume 112. In FIG. 4, the motor 124 is located in the second front volume 118. In FIGS. 6-7, 10, and 20, the motor 124 is located in the second back volume 120. In FIGS. 8-9, the motor 124 is located in the first front volume 110. In FIGS. 11-12, the motor 124 is located in the second back volume.

The motor 124 is powered via wires (not shown) extending therefrom and leading to an electrical terminal or interface 152 of the receiver 100. In other examples, the coil 156 may be disposed around the armature 126 without the bobbin 154, and instead the coil 156 is attached to the housing 102 or the yoke 158 for support. The first diaphragm 108 and the second diaphragm 116 are unhinged and exhibit pistonic action. The yoke 158 holds the pair of magnets 160 and 162 between which a portion of the armature 126 movably extends. The armature 126 is configured to deflect relative to the magnets 160, 162 in response to the application of an electrical signal to the coil 156. U-shaped armatures are shown but other armatures such as E-shaped and M-shaped armatures are known in the art and may be used alternatively.

In FIGS. 1, 6-10, and 20, the first link 132 which extends from one side of the armatures 126 couples the first diaphragm 108 with the armature 126, and the second link 146 extending from the opposite side of the armature 126 from the first link 132 couples the second diaphragm 116 with the armature 126. In some examples, the spring of the second link combined with the mass of the diaphragm form a resonator capable of creating resonance at higher frequencies. In FIGS. 1, 6, 10 and 20, the first link 132 and the second link 146 may be formed of a single part or separate parts. In FIG. 8, separate parts are used for the links 132 and 146. In FIGS. 2-5, the single link 132 couples the diaphragms 108 and 116 together without the aforementioned second link 146. In FIG. 8, the second link 146 originates from the first diaphragm 108 rather than the armature 126. In FIGS. 11 and 12, the link 132 is replaced with the link post 1104.

Any link as shown herein is capable of being coupled with the corresponding diaphragm(s) via the coupling member 139, which includes any suitable means to attach two components together. The coupling member may be an adhesive, epoxy or solvent dissolved urethane, vinyl acetate, cyanoacrylate, or other glue. In some examples, the coupling member 139 is a synthetic adhesive compound including, but not limited to, vinyl acetate or any other suitable polymer. In some examples, the link does not use any coupling member 139 and therefore does not couple with the diaphragm.

In some of the examples, the front volume is coupled with a corresponding sound outlet port through which the acoustic signals generated in the front volume pass through, whereas the back volume is coupled with a back volume vent through which air from the atmosphere is allowed to pass. Generally, any small back volume requires the pressure relieved from within the volume, so a vent is typically used. In some examples, the vent is coupled with the external atmosphere, whereas in other examples, the vent is coupled with a larger volume from within the receiver.

Figure 2:
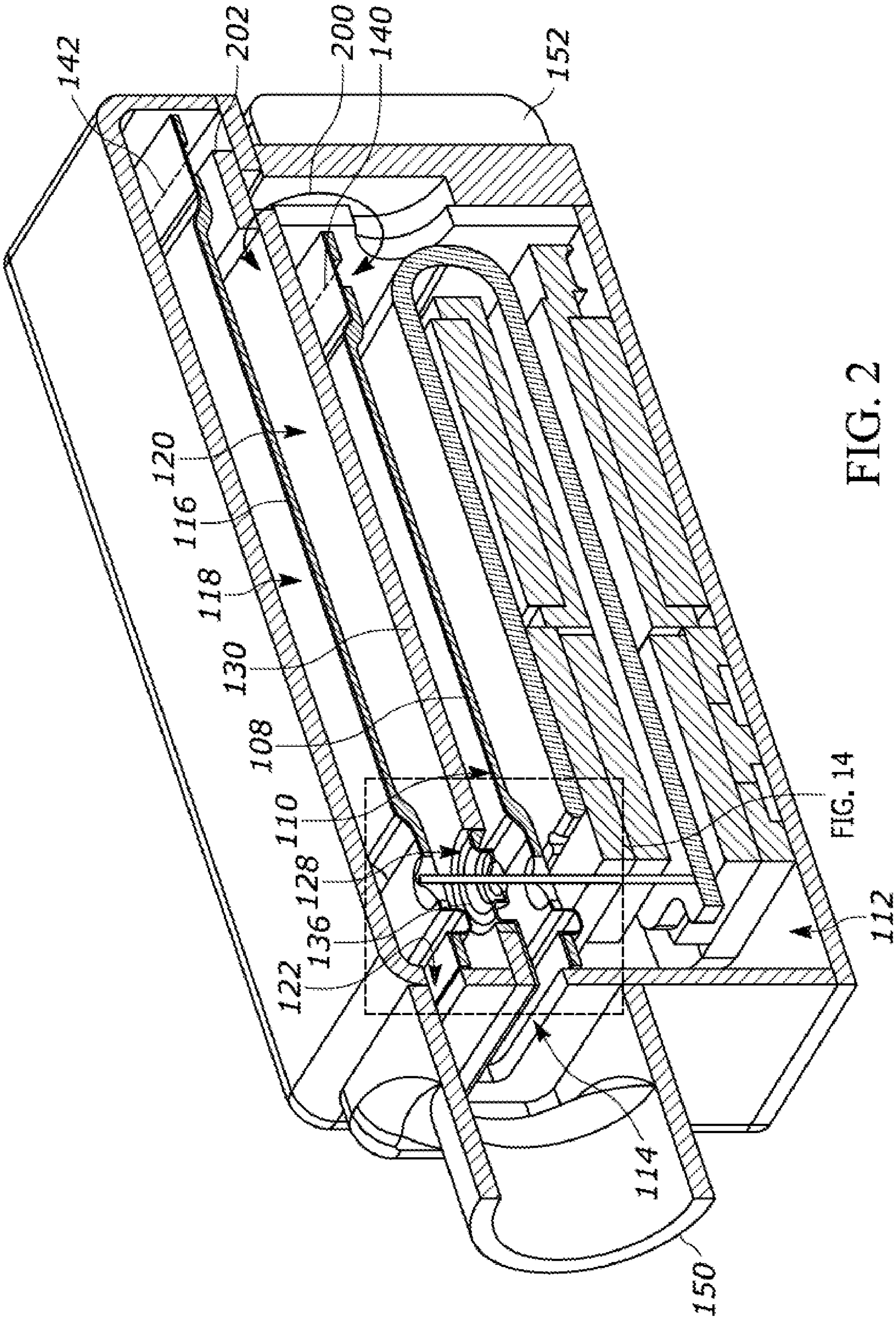
FIG. 2 shows a cross-sectional view of an acoustic receiver according to an embodiment.

FIGS. 1-2 and 6 show a nozzle 150 formed in or attached to the housing 102 which couples with at least one of the sound outlet ports (for example, the first sound outlet port 114 and/or the second sound outlet port 122). In these figures, the nozzle 150 is acoustically coupled with both of the sound outlet ports 114 and 122, which are directed toward the nozzle 150 such that any acoustic signal propagating from the sound outlet ports 114 and 122 is propagated from the nozzle 150 into the ear canal. In FIGS. 3, 8, and 20, the sound outlet ports 114 and 122 as well as a third sound outlet port 312 are all disposed on the housing 102 such that they face the same direction.

In FIGS. 1, 4-6, 8, and 20, a back volume vent 144 is shown to be coupled with the first back volume 112. In the examples shown in FIGS. 1 and 6, the second back volume 120 is not coupled with a back volume vent. However, in some examples, the second back volume 120 is coupled with a back volume vent similar to a second back volume vent 314 as shown in FIG. 3, 4, or 8.

In FIG. 1, the balanced armature receiver includes the housing having the first internal volume and the second internal volume. The first diaphragm separates the first internal volume into the first front volume and the first back volume. The first front volume has the first sound outlet port. The second diaphragm separates the second internal volume into the second front volume and the second back volume.

The second front volume has the second sound outlet port. The wall portion separates the first front volume from the second back volume. The motor is disposed at least partially inside the housing. The motor includes the armature mechanically coupled to the first diaphragm and to the second diaphragm. The acoustic seal is located at least partially in the opening of the wall between the first front volume and the second back volume. The acoustic seal accommodates the link coupling of the armature to the first diaphragm. The acoustic impedance of the acoustic seal is greater than an acoustic impedance of the first sound outlet port over a range of human detectable frequencies. In some examples, the first back volume is vented to an exterior of the housing. In some examples, the first back volume is acoustically coupled to the second back volume.

In FIG. 2, the first back volume 112 and the second back volume 120 are acoustically coupled via a path that defines an acoustic coupling 200, which enables the coupled back volumes 112 and 120 to vent using each other's volume instead of using the atmosphere as shown in some of the other embodiments. In some examples, a damper 202 is placed or formed in a path defining the coupling 200. As shown herein, a damper is any suitable component that that may be sued to tune the acoustic impedance characteristic of a port or path.

In FIG. 2, the balanced armature receiver includes the housing having the first internal volume and the second internal volume. The first diaphragm separates the first internal volume into the first front volume and the first back volume. The first front volume has the first sound outlet port. The second diaphragm separates the second internal volume into the second front volume and the second back volume. The second front volume has the second sound outlet port. The wall portion separates the first front volume from the second back volume. The motor is disposed at least partially inside the housing. The motor includes the armature mechanically coupled to the first diaphragm and the second diaphragm. The acoustic seal is located at least partially in the opening of the wall between the first front volume and the second back volume. The acoustic seal accommodates the link coupling the armature to the second diaphragm. The acoustic impedance of the acoustic seal is greater than the acoustic impedance of the first sound outlet port over the range of human detectable frequencies. In some examples, the first back volume is acoustically coupled to the second back volume. In some examples, the first back volume is vented to the exterior of the housing.

In FIG. 3, the second back volume vent 314 is coupled with the second back volume 120 and a third back volume vent 316 is coupled with a third back volume 306, whereas the back volume vents 314 and 316 are connected to the external atmosphere such that air is allowed to freely pass through the back volume vents 314 and 316 while the receiver 100 is activated. In some examples, the first back volume 112 lacks the first back volume vent 144. In some examples, the first back volume 112 is vented through the first back volume vent 144 as explained above, although not shown in FIG. 3.

In FIG. 3, the balanced armature receiver includes the housing having the first internal volume, the second internal volume, and the third internal volume. The first diaphragm separates the first internal volume into the first front volume and the first back volume. The first front volume has the first sound outlet port. The second diaphragm separates the second internal volume into the second front volume and the second back volume. The second front volume has the second sound outlet port. The third diaphragm separates the third internal volume into the third front volume and the third back volume. The third front volume has the third sound outlet port. The first wall portion separates the first front volume from the second back volume. The second wall portion separates the second front volume from the third back volume. The motor is disposed at least partially inside the housing. The motor includes the armature mechanically coupled to the first diaphragm, the second diaphragm, and the third diaphragm. The first acoustic seal is located at least partially in the opening of the wall between the first front volume and the second back volume. The first acoustic seal accommodates the first link coupling the armature to the first diaphragm. The second acoustic seal is located between the second front volume and the third back volume. The second acoustical seal accommodates the second link coupling the armature to the third diaphragm. The acoustic impedance of the acoustic seal is greater than the acoustic impedance of the first sound outlet port over the range of human detectable frequencies. The first or second acoustic seal also includes the flexible film extending at least partially across the opening of the corresponding first or second wall portion.

In some examples, the first or second link extends through the flexible film of the corresponding first or second acoustic seal and is adhered to the flexible film and to the corresponding diaphragm. In some examples, the first or second link is coupled to the flexible film of the corresponding first or second acoustic seal without extending through the flexible film. The flexible film is coupled to the corresponding diaphragm. The flexible film is disposed between the corresponding first or second link and the corresponding diaphragm. In some examples, the first or second acoustic seal includes the gel at least partially obstructing the opening of the corresponding first or second wall portion. The corresponding first or second link extends through the gel. In some examples, the second back volume and the third back volume are vented to an exterior of the housing. In some examples, the second back volume and the third back volume are vented to the exterior of the housing.

In FIG. 4, the first sound outlet port 114 includes a path formed by the terminal 152 and one or more portions of the housing 102, where the path defines an acoustic coupling 400 between the first front volume 110 and the second front volume 118. The first back volume 112 is vented via the first back volume vent 144 and the second back volume 120 is also vented via the second back volume vent 314. The second sound outlet port 122 is formed to couple the second front volume 118, so in effect, the second front volume 118 is acoustically coupled with both of the sound outlet ports 114 and 122.

FIG. 5 shows a plurality of openings in the housing 102 such that each of the openings is capable of defining the second sound outlet port 122. Also, in addition to the first damper 202 placed at the first back volume vent 144, a second damper 502 is introduced to be placed at the second back volume vent 314. In some examples, a damper also prevents external contaminants from entering the housing. An opening 504 in the armature 126 is also introduced to allow the link 132 to pass therethrough. In examples where dampers are used over back vents, the dampers may be used to produce a favorable bass response of the receiver. For example, the dampers may freely allow the passage air at very low frequencies but attenuate the passage of air at higher frequencies; this may be used to produce elevated low-end bass output, for example below 200 Hz, while not also increasing significantly the mid-range output of the balanced armature, for example between 200 Hz and 2000 Hz.

FIGS. 8-9 show an "open face" configuration for the second sound outlet port 122, where the second sound outlet port 122 is defined by an entire side of the housing 102. That is, instead of forming an aperture on a side of the housing 102 to define the second sound outlet port 122, the entire side of the housing 102, which in the example shown is the bottom side of the housing 102, is removed. Therefore, the perimeter of the sound outlet port 122 is effectively the perimeter of the housing 102 that supports the second diaphragm 116.

In FIG. 10, the coupling member 139, for example glue, that is used to attach the first diaphragm 108 to the link 132 does not completely cover an opening formed in the first diaphragm 108, which allows for an acoustic path to be formed between the back volumes 112 and 120, defining an acoustic coupling 1002 therebetween. Because the back volumes 112 and 120 are acoustically coupled, there is no back volume vent for either of the back volumes 112 and 120. In some examples, a back volume vent is formed for one or more of the back volumes 112 or 120. In some embodiments including a back vent, the coupling member 139 may completely block the acoustic path between the back volumes 112 and 120.

In FIGS. 11-12, the second diaphragm 116 is directly coupled to the armature 126 without using a link, and a wall portion 131 includes protrusions or inner walls 1100 that seals each of the front volumes 110 and 118 from the corresponding back volume 112 or 120, respectively. Therefore, the first back volume 112 is acoustically coupled with the second back volume 112, while the front volumes 110 and 118 are acoustically coupled with the corresponding sound outlet ports 114 and 112, respectively. Also shown is a vent opening 1102 for the back volumes 112 and 120. In some examples, the second diaphragm 116 is formed exclusively from the armature 126.

In FIG. 20, the first back volume 112 is vented via the first back volume vent 144, and the third back volume 306 is vented via the third back volume vent 314, whereas the second back volume 120 is shown to be not vented. In some examples, the second back volume 120 is vented via a vent similar to the second back volume vent 314 as shown in FIG. 3, 4, or 8.

In FIG. 20, the balanced armature receiver includes the housing having the first internal volume, the second internal volume, and the third internal volume. The first diaphragm separates the first internal volume into the first front volume and the first back volume. The first front volume has the first sound outlet port. The second diaphragm separates the second internal volume into the second front volume and the second back volume. The second front volume has the second sound outlet port. The third diaphragm separates the third internal volume into the third front volume and the third back volume. The third front volume has the third sound outlet port. The first wall portion separates the first front volume from the second back volume. The second wall portion separates the first back volume from the third front volume. The motor is disposed at least partially inside the housing. The motor includes the armature mechanically coupled to the first diaphragm, the second diaphragm, and the third diaphragm by one or more links. In some embodiments, the receiver includes a single link coupling the armature to the diaphragms. In some embodiments, the receiver includes two links. In some embodiments, the receiver includes more than two links. The first acoustic seal is located at least partially in the opening of the wall between the first front volume and the second back volume. The first acoustic seal accommodates the mechanical coupling of the armature to the first diaphragm. The second acoustic seal is located between the first back volume and the third front volume. The second acoustical seal accommodates the mechanical coupling of the armature to the third diaphragm. The acoustic impedance of the acoustic seal is greater than the acoustic impedance of the first sound outlet port over the range of human detectable frequencies.

In some examples, the flexible film is coupled to both the corresponding first or second wall portion and to the corresponding link. In some examples, the corresponding link extends through the flexible film and is adhered to the flexible film and to the corresponding diaphragm. In some examples, the corresponding link is coupled to the flexible film without extending through the flexible film. The flexible film is coupled to the corresponding diaphragm. The flexible film is disposed between the corresponding link and the corresponding diaphragm. In some examples, the first or second acoustic seal includes the gel or ferrofluid at least partially obstructing the opening of the corresponding first or second wall portion, and the corresponding link extending through the gel or ferrofluid. In some examples, the first back volume and the second back volume are vented to an exterior of the housing.

In some examples as disclosed herein, hinges are positioned on the diaphragms to allow for the diaphragms to move in response to the movement of the armature to which they are coupled. Specifically, FIGS. 1-2, 4-6, and 10 show two hinges: the first hinge 140 located on the first diaphragm 108 and the second hinge 142 located on the second diaphragm 116. In FIGS. 1-2, 4, and 6, the first and second hinges 140 and 142 are both positioned distally from the link 132 or 146. That is, the link 132 or 146 is located proximate to one end of the diaphragm 108 or 116 whereas the hinges 140 and 142 are located proximate to the other end of the diaphragm 108 or 116 opposite from the link 132 or 142. Therefore, the hinges 140 and 142 are positioned on the same side of the link 132 or 146.

In FIGS. 5 and 10, the first and second hinges 140 and 142 are positioned on opposing sides of the link 132 that couples them together. In FIG. 5 for example the second hinge 142 is located on the left side whereas the first hinge 140 is located on the right side). The mounting point of the link 132 to the diaphragm 116 is relatively close to the hinge 142, which means for small motions of the link 132 the average motion of this "levered" diaphragm 142 will be higher than for many traditional implementations. In some examples, the levered diaphragm is capable of producing acoustic signals with greater amplitudes than any other diaphragm in the receiver.

FIGS. 3, 8, and 20 show three hinges: the first hinge 140, the second hinge 142, and a third hinge 318 located on the third diaphragm 302. In FIGS. 3 and 20, all three hinges 140, 142, and 318 are located on the same side relative to the link 132 and/or 146. In FIG. 8, the third hinge 318 is positioned on the opposite side of the second link 146 from the other two hinges 140 and 142 (e.g., the third hinge 318 is located on the left side whereas the hinges 140 and 142 are located on the right side)). Furthermore, the third diaphragm 302 is not in line with the other diaphragms 108 and 116. Additionally, the positions of one or more of the hinges or the links are adjustable to determine the lever ratio when in the "levered" configuration due to some of the diaphragms having opposing pivots.

In some examples, there are no hinges located on any of the armatures. For example, FIGS. 11 and 12 show no hinges at all, and instead the diaphragms 108 and 116 are coupled together via the link post 1104 that is stiffer than the link 132 or 146 and allows for a stronger coupling between the two diaphragms 108 and 116.

Furthermore, the size of each diaphragm can be adjusted to make a certain diaphragm (or diaphragms) to be capable of producing greater volume displacement than the other diaphragm(s), or to enhance the output thereof. For example, in FIGS. 2 and 5, the second diaphragm 116 can achieve greater volume displacement than the first diaphragm 108 because the second diaphragm 116 is larger in size than the first diaphragm 108. Similarly, in FIGS. 4 and 10, the first diaphragm 108 is larger, and therefore can achieve greater volume displacement than the second diaphragm 116. In FIG. 3, the second diaphragm 116 and the third diaphragm 302 are larger than the first diaphragm 108. In FIG. 8, the third diaphragm 302 is larger than the other diaphragms 108 and 116.

In some examples, the receiver housing (such as the housing 102) is formed as a single monolithic component, whereas in other examples, the housing is formed by coupling together two or more separate subcomponents. Different means of coupling may be employed as suitable, for example gluing, clamping, fastening, attaching, welding, etc. In the examples where two subcomponents are involved, the subcomponents may be referred to a cover and a cup. In some examples, the cover at least partially defines one or more front volume, and the cup at least partially defines one or more back volume. In some examples, the cover at least partially defines one or more sound outlet port, and the cup at least partially defines one or more back volume vent. In some examples, the cover or the cup is also formed by coupling together two or more separate subcomponents. For example, the cup has one subcomponent that defines the sidewalls and another subcomponent that defines the bottom base portion. Furthermore, the components that are referred to as the "wall" of the housing can also be referred to as a "cover", or vice versa, in different embodiments.

While the present disclosure and what is presently considered to be the best mode thereof has been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

What is claimed is:

1. A balanced armature receiver comprising:

a housing having a first internal volume, a second internal volume, and a third internal volume;

a first diaphragm separating the first internal volume into a first front volume and a first back volume, the first front volume having a first sound outlet port;

a second diaphragm separating the second internal volume into a second front volume and a second back volume, the second front volume having a second sound outlet port;

a third diaphragm separating the third internal volume into a third front volume and a third back volume, the third front volume having a third sound outlet port;

a first wall portion separating the first front volume from the second back volume;

a second wall portion separating the second front volume from the third back volume;

a motor disposed at least partially inside the housing, the motor including an armature mechanically coupled to the first diaphragm, the second diaphragm, and the third diaphragm; and a first acoustic seal located at least partially in an opening of the first wall portion between the first front volume and the second back volume, the first acoustic seal accommodating a first link coupling the armature to the first diaphragm;

a second acoustic seal between the second front volume and the third back volume, the second acoustic seal accommodating a second link coupling the armature to the third diaphragm.

2. The receiver of claim 1, the first or second acoustic seal comprising a flexible film extending at least partially across the opening of the corresponding first or second wall portion.

3. The receiver of claim 2, the flexible film is a substantially planar and resilient material.

4. The receiver of claim 2, the flexible film having a formed fold.

5. The receiver of claim 2, the flexible film coupled to both the corresponding first or second wall portion and to the corresponding first or second link.

6. The receiver of claim 2, the first or second link extending through the flexible film of the corresponding first or second acoustic seal and adhered to the flexible film and to the corresponding diaphragm.

7. The receiver of claim 2, the first or second link coupled to the flexible film of the corresponding first or second acoustic seal without extending through the flexible film, and the flexible film coupled to the corresponding diaphragm, wherein the flexible film is disposed between the corresponding first or second link and the corresponding diaphragm.

8. The receiver of claim 1, the first or second acoustic seal comprising a gel at least partially obstructing the opening of the corresponding first or second wall portion, and the corresponding first or second link extending through the gel.

9. The receiver of claim 1, the second back volume and the third back volume vented to an exterior of the housing.

10. A balanced armature receiver comprising:

a housing having a first internal volume, a second internal volume, and a third internal volume;

a first diaphragm separating the first internal volume into a first front volume and a first back volume, the first front volume having a first sound outlet port;

a second diaphragm separating the second internal volume into a second front volume and a second back volume, the second front volume having a second sound outlet port;

a third diaphragm separating the third internal volume into a third front volume and a third back volume, the third front volume having a third sound outlet port;

a first wall portion separating the first front volume from the second back volume;

a second wall portion separating the first back volume from the third front volume;

a motor disposed at least partially inside the housing, the motor including an armature mechanically coupled to the first diaphragm, the second diaphragm, and the third diaphragm by at least one link; and a first acoustic seal located at least partially in an opening of the first wall portion between the first front volume and the second back volume, the first acoustic seal accommodating the mechanical coupling of the armature to the first diaphragm;

a second acoustic seal between the first back volume and the third front volume, the second acoustical seal accommodating the mechanical coupling of the armature to the third diaphragm.

11. The receiver of claim 10, the first or second acoustic seal comprising a flexible film extending at least partially across the opening of the corresponding wall portion.

12. The receiver of claim 11, the flexible film is a substantially planar and resilient material.

13. The receiver of claim 11, the flexible film having a formed fold.

14. The receiver of claim 11, the flexible film coupled to both the corresponding first or second wall portion and to the corresponding link.

15. The receiver of claim 11, the corresponding link extending through the flexible film and adhered to the flexible film and to the corresponding diaphragm.

16. The receiver of claim 11, the corresponding link coupled to the flexible film without extending through the flexible film, and the flexible film coupled to the corresponding diaphragm, wherein the flexible film is disposed between the link and the corresponding diaphragm.

17. The receiver of claim 10, the first or second acoustic seal comprising a gel at least partially obstructing the opening of the corresponding first or second wall portion, and the corresponding link extending through the gel.

18. The receiver of claim 10, the first or second acoustic seal comprising a ferrofluid at least partially obstructing the opening of the corresponding first or second wall portion, and the corresponding link extending through the ferrofluid.

19. The receiver of claim 10, the first back volume and the second back volume vented to an exterior of the housing.

20. The receiver of claim 10, wherein an acoustic impedance of the first acoustic seal is different than an acoustic impedance of the first sound outlet port over a range of human detectable frequencies.

* * * * *